(12) United States Patent
Kondo et al.

(10) Patent No.: US 7,689,053 B2
(45) Date of Patent: Mar. 30, 2010

(54) IMAGE PROCESSING METHOD

(75) Inventors: Satoshi Kondo, Yawata (JP); Miki Haseyama, Sapporo (JP); Norihiro Kakukou, Sapporo (JP)

(73) Assignee: Panasonic Corporation, Osaka (JP)

( * ) Notice: Subject to any disclaimer, the term of this patent is extended or adjusted under 35 U.S.C. 154(b) by 1113 days.

(21) Appl. No.: 11/331,143

(22) Filed: Jan. 13, 2006

(65) Prior Publication Data
US 2006/0165307 A1 Jul. 27, 2006

(30) Foreign Application Priority Data
Jan. 26, 2005 (JP) ............................. 2005-018292

(51) Int. Cl.
*G06K 9/46* (2006.01)
(52) U.S. Cl. ................................... 382/249; 348/403.1
(58) Field of Classification Search ................. 382/100, 382/232, 248, 249, 250; 348/395.1, 403.1–408.1
See application file for complete search history.

(56) References Cited

U.S. PATENT DOCUMENTS

| | | | | |
|---|---|---|---|---|
| 6,055,335 | A * | 4/2000 | Ida et al. ..................... | 382/232 |
| 6,275,615 | B1 * | 8/2001 | Ida et al. ..................... | 382/232 |
| 6,898,332 | B2 | 5/2005 | Matsuhira | |
| 2002/0067864 | A1 | 6/2002 | Matsuhira | |
| 2003/0095723 | A1 * | 5/2003 | Ishizaka et al. ............. | 382/298 |
| 2004/0081355 | A1 * | 4/2004 | Takahashi ................... | 382/165 |
| 2006/0165307 | A1 * | 7/2006 | Kondo et al. ................ | 382/249 |

FOREIGN PATENT DOCUMENTS

| | | |
|---|---|---|
| JP | 3-32184 | 2/1991 |
| JP | 2000-312294 | 11/2000 |
| JP | 2002-152495 | 5/2002 |
| JP | 2002-163648 | 6/2002 |
| JP | 2002-185770 | 6/2002 |
| JP | 2002-197455 | 7/2002 |

\* cited by examiner

*Primary Examiner*—Anand Bhatnagar
(74) *Attorney, Agent, or Firm*—Wenderoth, Lind & Ponack, L.L.P.

(57) ABSTRACT

An image processing method is described which makes it possible to obtain an image which has a high quality and resolution without leaving boundaries of adjacent blocks detectable even in the case where the image has already been subjected to a processing of resolution enhancement (enlargement) of the image using a set of fractal parameters. The image processing apparatus 100 includes: an image division unit 114 which divides an input image IN into range blocks using L (L is an integer of 2 or more) numbers of division patterns so that at least one of the boundaries of each region in a division pattern varies from the boundaries of each region in the other division patterns; a parameter calculation unit 103 which calculates a set of fractal parameters of each range block of the input image IN so as to obtain L numbers of fractal parameters; an image transformation unit 107 which generates L numbers of fractal transformed images using, one by one, the modified sets of fractal parameters obtained according to enlargement ratios; and an image synthesis unit 112 which synthesizes the L numbers of transformed images so as to generate a single synthesized image. The image transformation unit 107 and the image synthesis unit 112 repeat the transformation and synthesis using in sequence the respective sets of fractal parameters until this synthesized image satisfies the convergence condition.

14 Claims, 18 Drawing Sheets

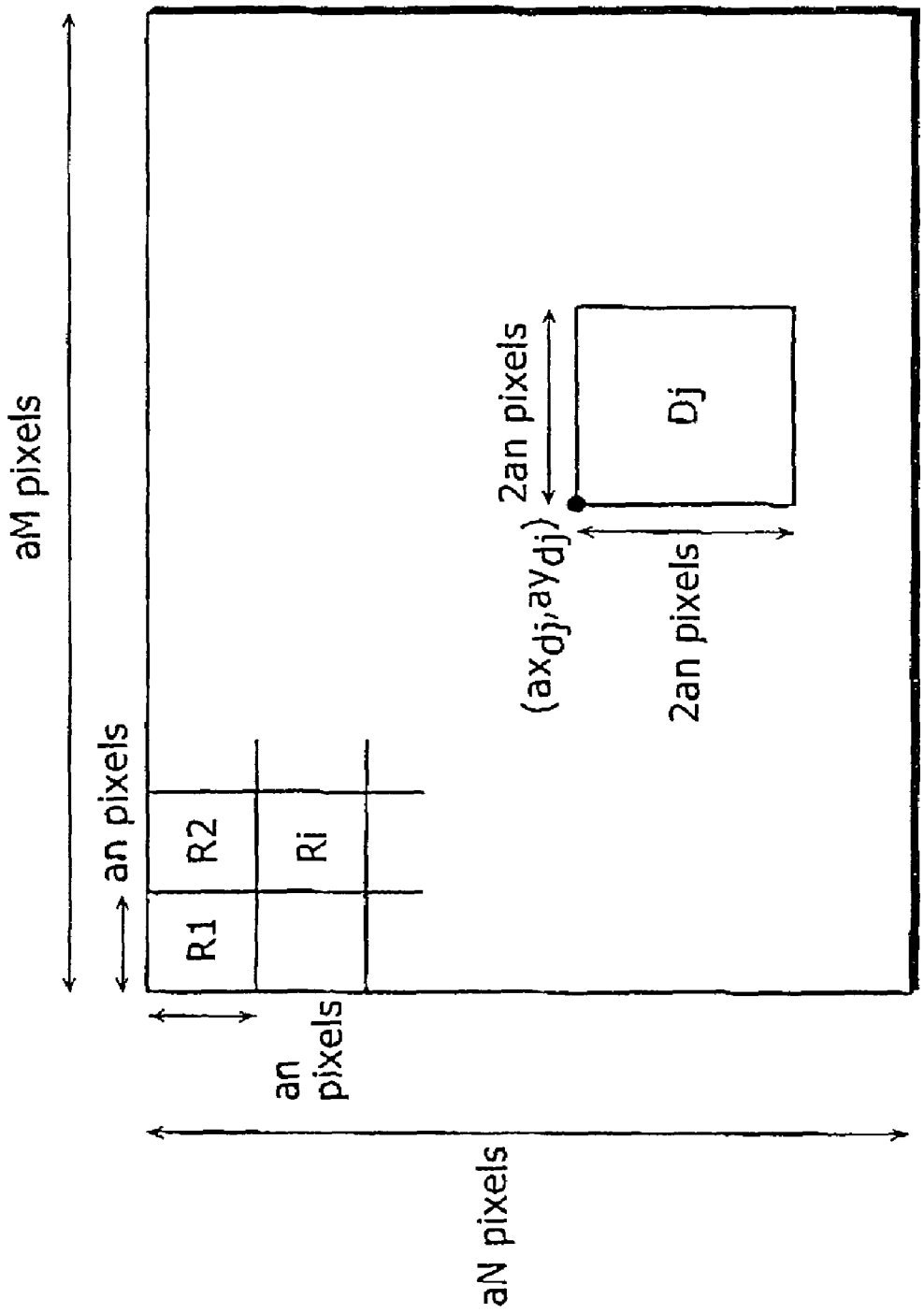

IMAGE PROCESSING METHOD

BACKGROUND OF THE INVENTION (1) Field of the Invention

The present invention relates to an image processing method used in resolution enhancement (enlargement) of an image signal.

(2) Description of the Related Art

Conventionally, as a method for resolution enhancement (enlargement) of an image signal, a method for using a fractal coding technique has been proposed (for example, refer to Japanese Patent Publication No. 2000-312294). In this method, a set of fractal parameters of image data of 8×8 pixels in an input image is detected first. After that, the fractal image data of 16×16 pixels is generated using the set of fractal parameters. Further, the 8×8 pixel image data is cut out from the input image, and the 16×16 pixel image data is cut out from the fractal image, and then the respective 8×8 pixel image data and 16×16 pixel image data are subjected to Discrete Cosine Transform (DCT). These two DCT coefficient matrixes are synthesized, and subjected to Inverse Discrete Cosine Transform so as to generate a resolution-enhanced (enlarged) image.

However, in the above-described conventional method, the processing of generating an enlarged image of 16×16 pixel block using the set of fractal parameters detected in the 8×8 pixel block is executed independently on a block-by-block basis. This makes it possible to perform high fidelity resolution transformation of each block. However, since the continuity around the boundaries of blocks is not considered in the transformation, it is likely to occur a phenomenon where the boundaries of adjacent blocks are visually detected.

SUMMARY OF THE INVENTION

Therefore, the present invention solves the conventional problem of the present invention. An object of the present invention is to provide an image processing method which makes it possible to obtain an image which has a high quality and resolution without leaving boundaries of adjacent blocks detectable even in the case where the image has been subjected to a processing of resolution enhancement (enlargement) of the image using a set of fractal parameters.

In order to achieve the above object, the image processing method, of the present invention, is intended for processing an input image using fractal transformation. The image processing method includes: dividing the input image into regions using L (L being an integer of 2 or more) numbers of division patterns so that at least one of boundaries of each region in a division pattern varies from boundaries of each region in the other division patterns; calculating L numbers of sets of fractal parameters of the respective regions included in the input image, on a division pattern basis; and generating a fractal image by performing the fractal transformation of an image which is a target image to be transformed using the respective L numbers of sets of fractal parameters.

Here, in a first aspect of the present invention, the image processing method further includes modifying each of the L numbers of sets of fractal parameters according to a predetermined enlargement ratio. In the generating of the image processing method, high-resolution fractal images obtained by enlarging the input image are generated by performing the fractal transformation of the target image respectively using the L numbers of modified sets of fractal parameters. Here, the target image is obtained by enlarging a predetermined image according to the enlargement ratio.

In this way, using the set of fractal parameters in the resolution enhancement (enlargement) of the input image makes it possible to generate the resolution-enhanced (enlarged) image whose regions have a high fidelity. In addition, plural division patterns are used at the time of dividing the input image into the plural regions. This makes it possible to obtain an image which has a high quality and resolution without leaving boundaries of adjacent blocks detectable although boundaries of adjacent blocks have been detectable in the conventional method.

In addition, in a second aspect of the present invention, in the generating of the image processing method, L numbers of fractal images may be generated by performing the fractal transformation of the target image respectively using the L numbers of modified sets of fractal parameters. The image processing method may further include generating a synthesized image by synthesizing the L numbers of fractal images.

Here, in a third aspect of the present invention, in the generating of the synthesized image of the image processing method, whether the generated synthesized image satisfies a predetermined convergence condition may be judged. In addition, in the generating of the fractal images of the image processing method, each of the L numbers of fractal images may be generated by performing the fractal transformation of a synthesized image again, using each modified set of fractal parameters, in the case where it is judged in the judging that the synthesized image does not satisfy the predetermined convergence condition.

In addition, in the third aspect of the present invention, in the generating of the fractal images of the image processing method, the fractal transformation may be repeated until the fractal images satisfy a predetermined convergence condition, on a modified set of fractal parameter basis.

In this way, it becomes possible to obtain an image which has a high quality and resolution without leaving boundaries of adjacent blocks detectable.

In addition, in the third aspect of the present invention, the image processing method may further include: extracting an edge in the input image; and determining a weight of each fractal image used in the generating of the synthesized image based on the position of the extracted edge. In addition, in the dividing of the image into regions of the image processing method, the input image may be divided into regions based on the position of the edge. Additionally, in the generating of the synthesized image, the L numbers of fractal images may be synthesized based on the weight of each fractal image.

In this way, it becomes possible to generate an image which has a high fidelity and resolution even around the edge positions in the image.

In addition, in the second aspect of the present invention, in the generating of the image processing method, the fractal image may be generated in the following sequence by: performing the fractal transformation of a predetermined image using one of the L numbers of modified sets of fractal parameters; performing the fractal transformation of the fractal image transformed previously using one of the other modified sets of fractal parameters; and performing the fractal transformation of each fractal image transformed in sequence from a fractal image which has been transformed immediately before, using one of the remaining modified sets of fractal parameters.

In this way, at the time of transforming a fractal image using the second or one of the following sets of fractal parameters, the current fractal image, which is converged using the set of fractal parameters which has been generated immediately before, is used as the fractal image to be transformed next. Therefore, there is no need to synthesize the already converged images generated using the respective sets of fractal parameters.

Note that the present invention can be realized not only as an image processing method like this but also as an image processing apparatus which has units corresponding to the unique steps of the image processing method and also as a program which causes a computer to execute these steps. Of course, the program like this can be distributed through a recording medium such as a CD-ROM and a communication medium such as the Internet.

As clearly described above, the image processing method of the present invention makes it possible to perform resolution enhancement (enlargement) of a target image without leaving boundaries of adjacent regions detectable by extracting the set of fractal parameters from the image to be processed and by using the set of fractal parameters in the processing.

Therefore, the present invention makes it possible to generate an image with a high resolution based on a target image. Thus, the present invention is highly practical today when handling of digitalized images has been rapidly become popular.

FURTHER INFORMATION ABOUT TECHNICAL BACKGROUND TO THIS APPLICATION

The disclosure of Japanese Patent Application No. 2005-018292 filed on Jan. 1, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a schematic diagram for illustrating the image processing method (in First Embodiment) of the present invention;

FIG. 14A is an illustration showing an example of a physical format of a flexible disc which is a recording medium body, FIG. 14B is an illustration showing the front view and the sectional view of the appearance of the flexible disc, and the front view of the flexible disc body;

FIG. 14C is an illustration showing the configuration for recording the program on the flexible disc FD and reproducing the program recorded on the flexible disc FD;

DESCRIPTION OF THE PREFERRED EMBODIMENT(S)

Embodiments of the present invention will be described below with reference to FIGS. 1 to 18.

First Embodiment

Figure 1:
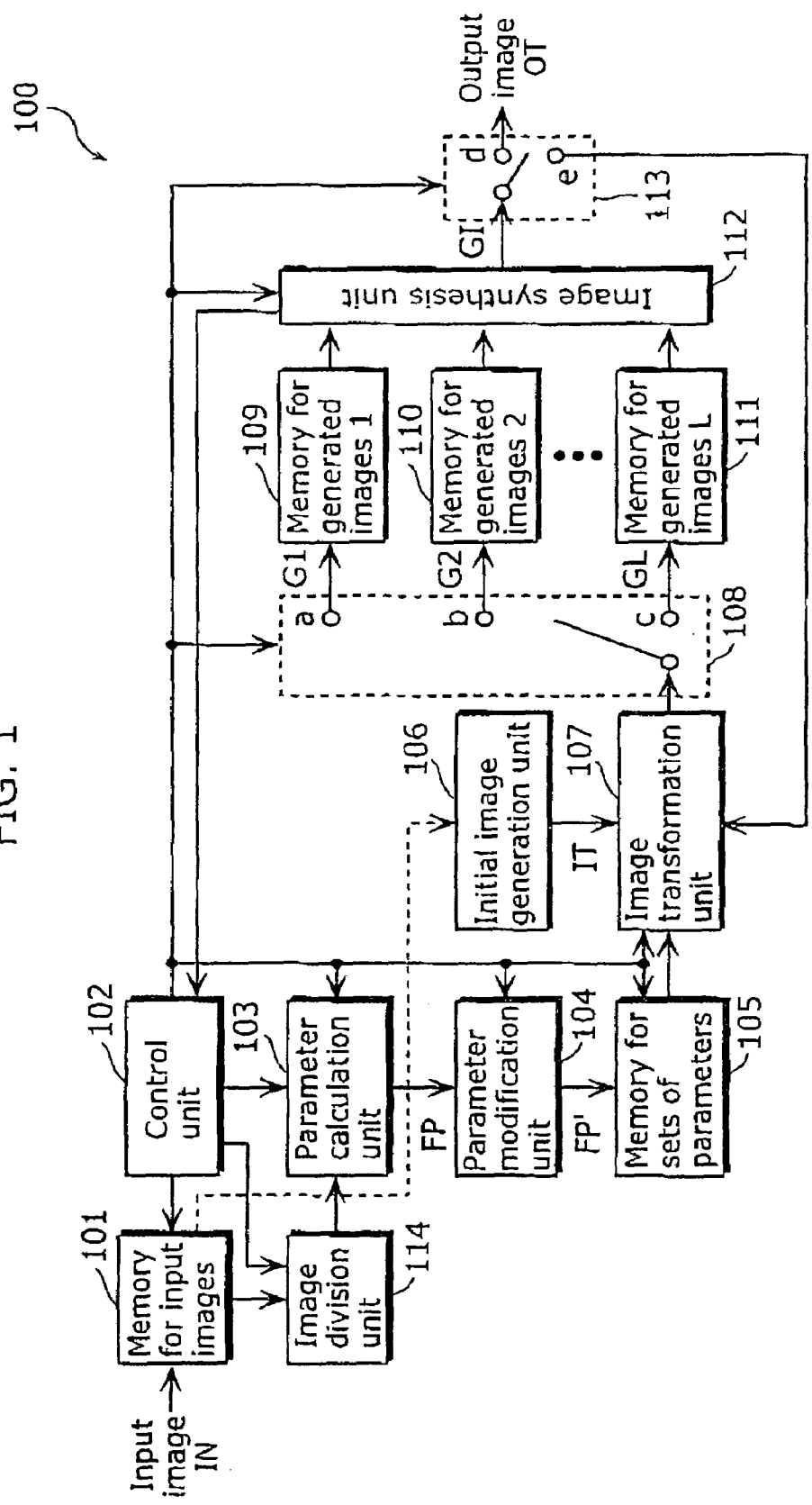
FIG. 1 is a block diagram showing the configuration of an image processing apparatus (in First Embodiment) which uses an image processing method of the present invention.

FIG. 1 is a block diagram showing the configuration of the image processing apparatus 100 which uses the image processing method of First Embodiment of the present invention. As shown in FIG. 1, the image processing apparatus 100 includes: a memory for input images 101; a control unit 102; a parameter calculation unit 103; a parameter modification unit 104; a memory for sets of parameters 105; an initial image generation unit 106; an image transformation unit 107; a switching unit 108; L numbers of memories for generated images 109 to 111; an image synthesis unit 112; a switching unit 113; and an image division unit 114.

Input images IN are held in the memory for input images 101. Here, the input images IN are assumed to have the size of horizontal M pixels×vertical N pixels.

The parameter calculation unit 103 reads out in sequence the input images IN held in the memory for input images 101 so as to perform its processing. The parameter calculation unit 103 performs the processing of calculating sets of fractal parameters of the partial images (range blocks) of each input image IN.

The image division unit 114 divides the input image IN into plural regions (range blocks) using L (an integer of 2 or more) numbers of division patterns so that at least one of the boundaries of each region in a division pattern varies from the boundaries of each region in the other division patterns. Here, the input image IN is divided into range blocks so that no range blocks are overlapped with each other. In addition, the region which is referred to at the time of calculating the set of fractal parameters of the current range block is called domain block. The division pattern for dividing the input image IN into range blocks and domain blocks is specified by the control unit 102. The control unit 102 can specify plural division patterns.

Figure 2A:
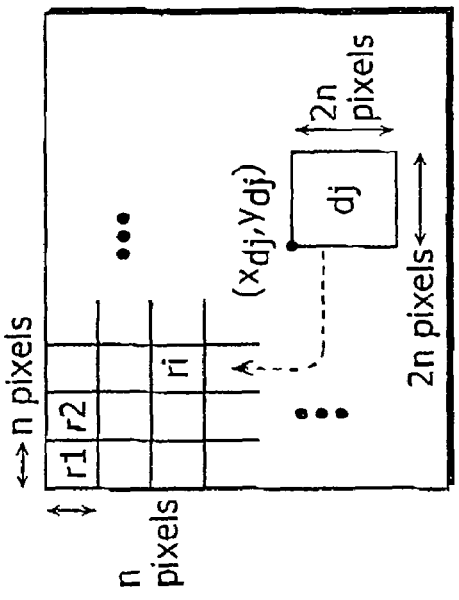
FIG. 2A to 2C each is a schematic diagram for illustrating the image processing method (in First Embodiment) of the present invention.

First, as a first division pattern for dividing the input image IN into range blocks, as shown in FIG. 2A, here will be described the case of dividing the input image IN into n×n pixel blocks assuming that the left top end as an origin (starting point) in the processing.

Figure 2B:
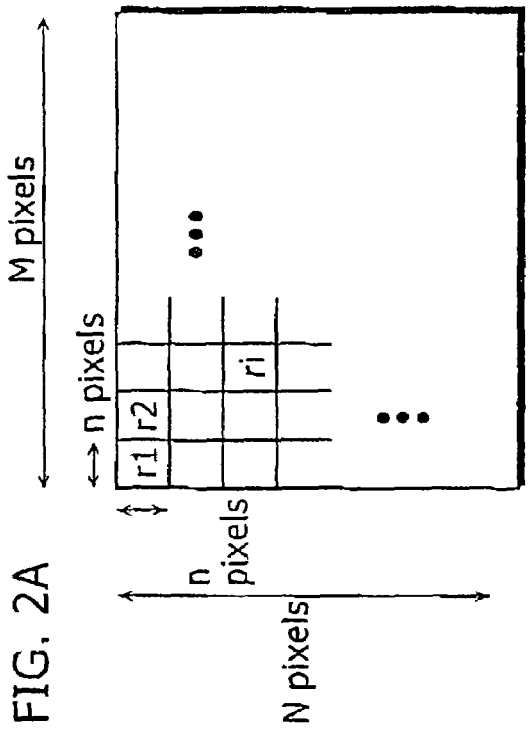
Figure 2C:
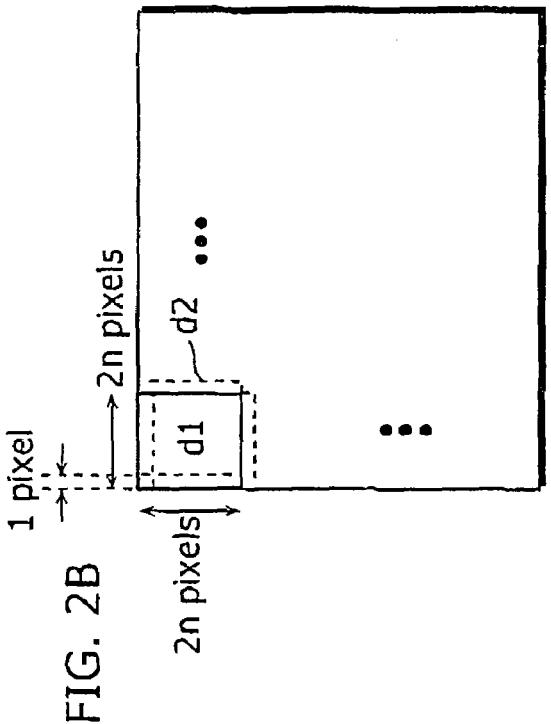

The parameter calculation unit 103 calculates, in sequence, the set of fractal parameters of each range block ri (i shows the number of each range block) obtained by dividing the input image IN. At the time of calculating a set of fractal parameters, domain block dj (j shows the number of each domain block) is cut out from the input image IN, and the set of parameters of the domain block is calculated. In the case where range blocks are obtained by dividing the input image IN as shown in FIG. 2A, as a division pattern for dividing the input image IN into domain blocks, there is an example division pattern of dividing the input image IN into square blocks of 2n×2n pixels as shown in FIG. 2B. Here, it is assumed that domain blocks d1, d2, . . . dj can be obtained in the input image IN by shifting a starting point on a pixel-by-pixel basis. As an example positional relationship between a range block and the corresponding domain block, a range block ri refers to the optimum domain block dj as shown in FIG. 2C.

The processing of the parameter calculation unit 103 will be described in detail. Pixel value f (x, y) of the pixels which are present in a domain block dj (here, x and y show a two-dimensional position in the input image IN) is subjected to affine transformation so as to obtain a scaled-down domain block dj. The pixel value fd' (x", y") of the resulting scaled-down domain block dj' is defined by Equations 1 to 3.

$$f_{d'_j}(x'', y'') = sf'_{d'_j}(x', y') + o \quad \text{(Equation 1)}$$

$$f'_{d'_j}(x', y') = \frac{1}{4}\sum_{u=0}^{1}\sum_{v=0}^{1} f(2x' + u + x_{d_j}, 2y' + v + y_{d_j}) \quad \text{(Equation 2)}$$

$$\begin{pmatrix} x'' \\ y'' \end{pmatrix} = \begin{pmatrix} \cos\theta & -C\sin\theta \\ \sin\theta & C\cos\theta \end{pmatrix}\begin{pmatrix} x' \\ y' \end{pmatrix} + \begin{pmatrix} e \\ f \end{pmatrix} \quad \text{(Equation 3)}$$

Here, Θ shows a rotation angle of affine transformation, and is selected from among 0, π/2, π, and 3π/2 (rad). In addition, c is one of +1 and −1, and shows the presence or absence of reverse with respect to the vertical axis which passes through the center of the domain block. Additionally, e and f are constants for correcting the coordinate resulting from rotation and reversion. Further, s and o are called scaling coefficient and offset coefficient respectively. Such a scaling coefficient and an offset coefficient that provide a minimum difference between the range block and the scaled-down domain block shown in FIG. 4 are selected.

$$E = \sum_{x''=0}^{n-1}\sum_{y''=0}^{n-1} (f_{d'_j}(x'', y'') - f(x'' + x_{r_i}, y'' + y_{r_i}))^2 \quad \text{(Equation 4)}$$

In addition, (xri, yri) shows the position (in the input image IN) of the left top end pixel of the range block ri, and (xdj, ydj) shows the position (in the input image IN) of the left top end pixel of the domain block dj. For a range block ri, the domain block which provides the minimum error E obtained by Equation 4 is selected from among the domain blocks in the input image IN, and the resulting (xd, yd), Θ, c, s and o are assumed to be the set of fractal parameters FPi. The set of fractal parameters calculated for each range block is outputted to the parameter modification unit 104.

Figure 3A:
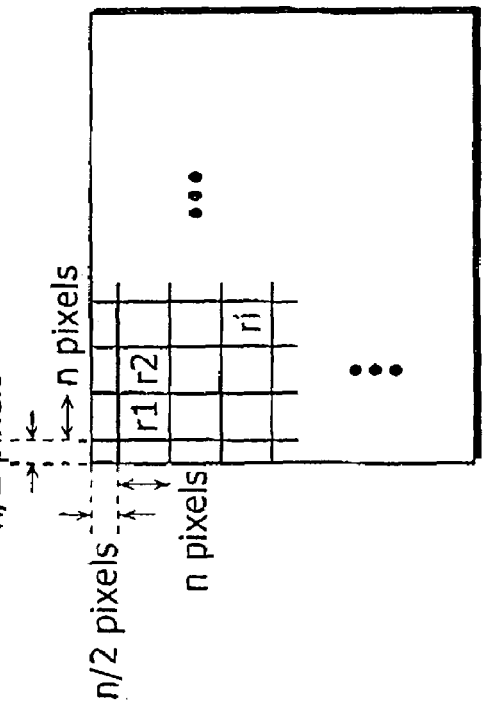
FIG. 3A to 3C each is a schematic diagram for illustrating the image processing method (in First Embodiment) of the present invention.
Figure 3B:
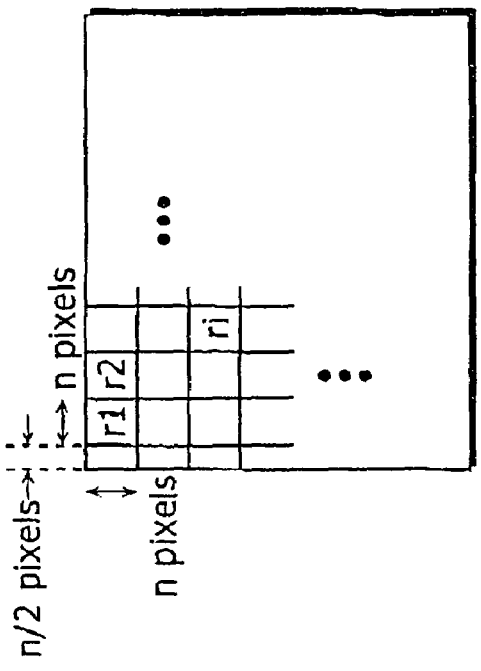
Figure 3C:
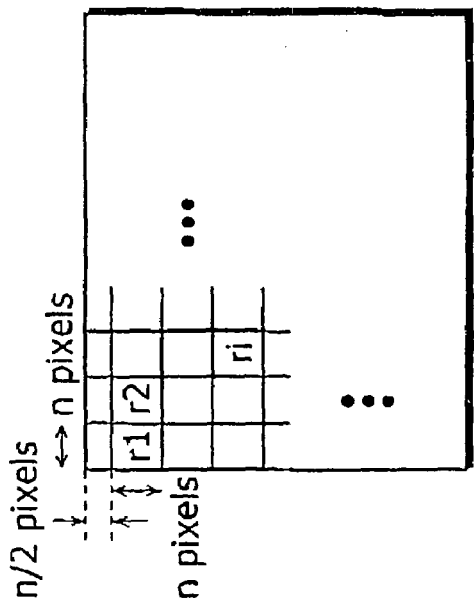

Next, FIG. 3 shows an example of the second division pattern for dividing the input image IN into range blocks. In this case, the starting position of the range block in the input image IN is shifted from the left top end of the input image IN. As this shift, various values can be set. For example, available division patterns which respectively provide the following shifts from the starting position are: a shift only in the horizontal direction by n/2 pixels (FIG. 3A); a shift only in the vertical direction by n/2 pixels (FIG. 3B); and a shift in the horizontal and vertical directions by n/2 pixels (FIG. 3C). In this case, the same division patterns as described above may be used as the division patterns for the corresponding domain block.

The method for calculating a set of fractal parameters of each range block obtained in this way using a domain block is the same as the method described above. The obtained set of fractal parameters is outputted to the parameter modification unit 104.

Figure 4A:
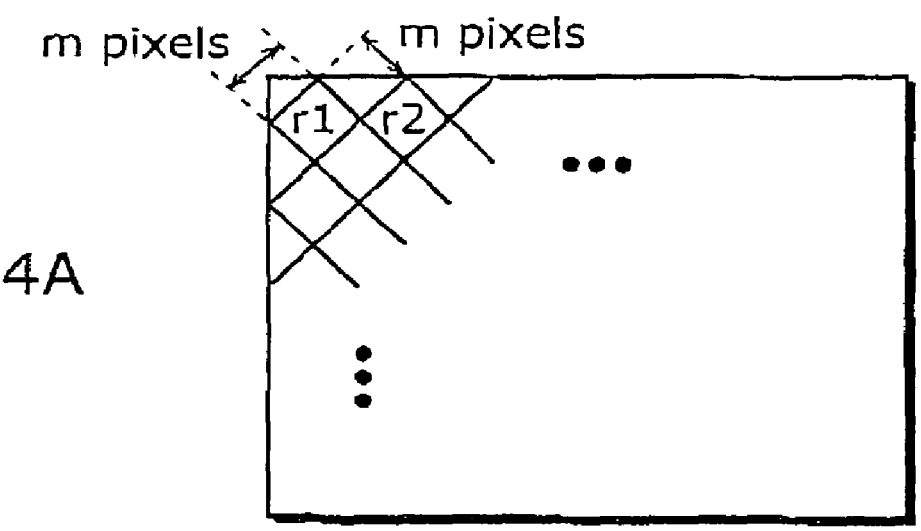
FIGS. 4A and 4B each is a schematic diagram for illustrating the image processing method (in First Embodiment) of the present invention.
Figure 4B:
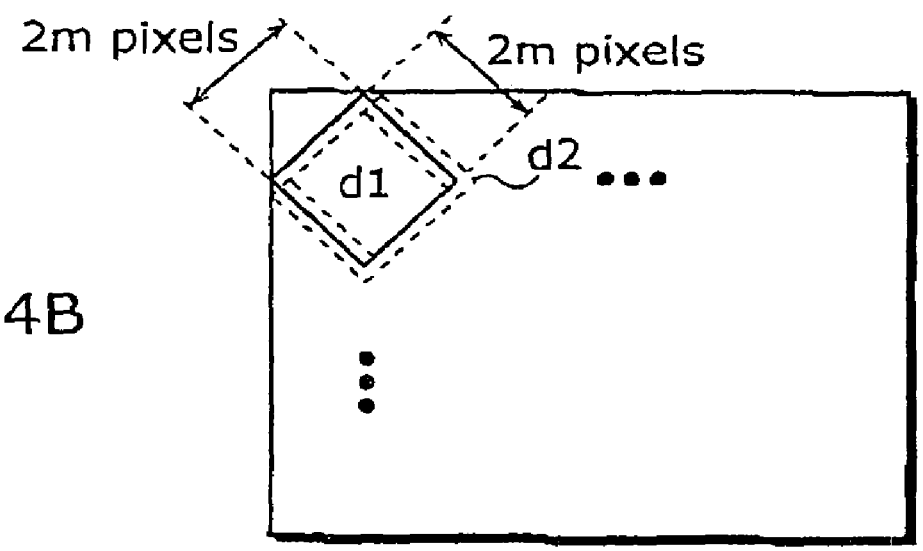

Next, FIG. 4A shows an example of the third division pattern for dividing the input image IN into range blocks. As shown in FIG. 4A, in the third division pattern, the input image IN is divided into regions of m×m pixels with a lean of 45 degrees. In this case, in the case of cutting out a domain block from the input image IN, a region of 2m×2m pixels with a lean of 45 degrees is cut out as shown in FIG. 4B. The domain block can be cut out by shifting on a pixel-by-pixel basis. The method for calculating the set of fractal parameters of each range block using the range block and the domain block obtained in this way is the same as the method described above. The obtained set of fractal parameters is outputted to the parameter modification unit 104.

In addition, at the time of dividing the input image IN into range blocks, as there is the second division pattern corresponding to the first division pattern, for the third pattern (for dividing the input image IN into range blocks with a lean of 45 degrees, there may be a pattern for dividing the input image IN into range blocks by shifting the starting position.

In addition, it is possible to vary the sizes of range blocks at the time of dividing the input image IN into range blocks, in the case of using different division patterns by shifting the division starting positions of the range blocks so that the second division pattern is obtained by shifting the division starting positions of the range blocks of the first division pattern.

As described up to this point, the image division unit 114 divides the input image IN into range blocks using plural division patterns specified by the control unit 102. After that, the parameter calculation unit 103 calculates the sets of fractal parameters for the range blocks respectively obtained by using the division patterns. In other words, the number of the sets of fractal parameters which are present equals to the number of division patterns for dividing the input image IN into range blocks. Here, L numbers of division patterns for division into range blocks are assumed to be used. In other words, there are L numbers of sets of fractal parameters.

The parameter modification unit 104 performs the processing of modifying the set of fractal parameters FP obtained by the parameter calculation unit 103 into the modified set of fractal parameters FP' which is suitable for enlargement according to an enlargement ratio a. The enlargement ratio a is specified by the control unit 102. In the case where the parameter modification unit 104 modifies the set of fractal parameters, the position information (xd, yd), of the domain block, in the sets of fractal parameters is multiplied by a. The modified set of fractal parameters FP' is held in the memory for sets of parameters 105. The parameter modification unit 104 performs this processing on the respective L sets of fractal parameters.

The image transformation unit 107 generates fractal images using the modified sets of fractal parameters FP' one by one. In generating the fractal images, an arbitrary image with a size of aM×aN pixels (a is an enlargement ratio) is prepared as an initial image first. As an initial image, for example, an image which is composed of gray level pixels and an image obtained by enlarging the input image IN using the zero-order hold method, the bilinear method, the bicubic method and the like can be used. This initial image IT is generated by the initial image generation unit 106 and inputted into the image transformation unit 107 so as to become the image to be transformed.

Here will be described details of how the image transformation unit 107 generates fractal images. First, as shown in FIG. 5, the image to be transformed is divided into each partial image (enlarged range block) Ri of an×an pixels. For the region of each enlarged range block Ri, a modified set of fractal parameters is applied and the image of each enlarged domain block is used as a reference image so as to generate each fractal image. The enlarged domain block can be obtained by cutting out the partial image of 2an×2an pixels at the position (axd, ayd) of the domain block of the modified sets of fractal parameters. The generated fractal images are stored in the memories for generated images through the switching unit 108. Here, a generated image obtained based on a modified set of fractal parameters is held in a memory for the generated image. For example, the fractal image G1 processed using the first modified set of fractal parameters is held in the memory for generated images 1 (109), the fractal image G2 processed using the second modified set of fractal parameters is held in the memory for generated images 2 (110), and the fractal image GL processed using the Lth modified set of fractal parameters is held in the memory for generated images L (111). After completing the processing for all the range blocks of the image to be transformed using a certain set of fractal parameters, the image transformation unit 107 performs the transformation processing for the image to be transformed using the next modified set of fractal parameters and holds the generated fractal images in sequence in the memories for generated images.

After the image transformation unit 107 completes the processing for the image to be transformed using all the modified sets of fractal parameters, the image synthesis unit 112 synthesizes L numbers of fractal images (generated images) G1 to GL held in the memories for generated images 1 to L into a single image GI. Here, a method for synthesizing Images includes: a method for calculating the median value or the mean value of the L numbers of pixels which are present in the same positions of the images which correspond to each other; a method for synthesizing only the pixels which are positioned close to the center parts of the enlarged range blocks. The synthesized image GI generated by the image synthesis unit 112 is inputted to the switching unit 113.

In the case where the synthesized image GI satisfies the convergence condition, the switching unit 113 is connected to a terminal d, and the synthesized image GI is outputted as an output image OT. In addition, in the case where the synthesized image GI does not satisfy the convergence condition, the switching unit 113 is connected to a terminal e, and the synthesized image GI is inputted to the image transformation unit 107 so as to be processed as an image to be transformed. The image transformation unit 107 has performed the processing using the initial image IT, which is generated by the initial image generation unit 106, as the image to be transformed at the starting time of the processing. However, the following processing is performed using the synthesized image GI, which is generated by the image synthesis unit 112, as the image to be transformed. In this way, the image transformation unit 107 and the image synthesis unit 112 repeat the processing until the synthesized images GI are converged. Here, available methods for judging whether the synthesized image GI satisfies the convergence condition or not include: a method for judging that the synthesized images GI are converged when the sum of differences (absolute values or square values) between the synthesized image previously generated by the image synthesis unit 112 and the current synthesized image equals to or no greater than a predetermined threshold; and a method for judging that the convergence condition is satisfied when the processing has been repeated predetermined times. In this case, the image synthesis unit 112 may judge whether the convergence condition is satisfied or not and notify the judgment to the control unit 102, and the control unit 102 may control the switching unit 113.

Figure 6:
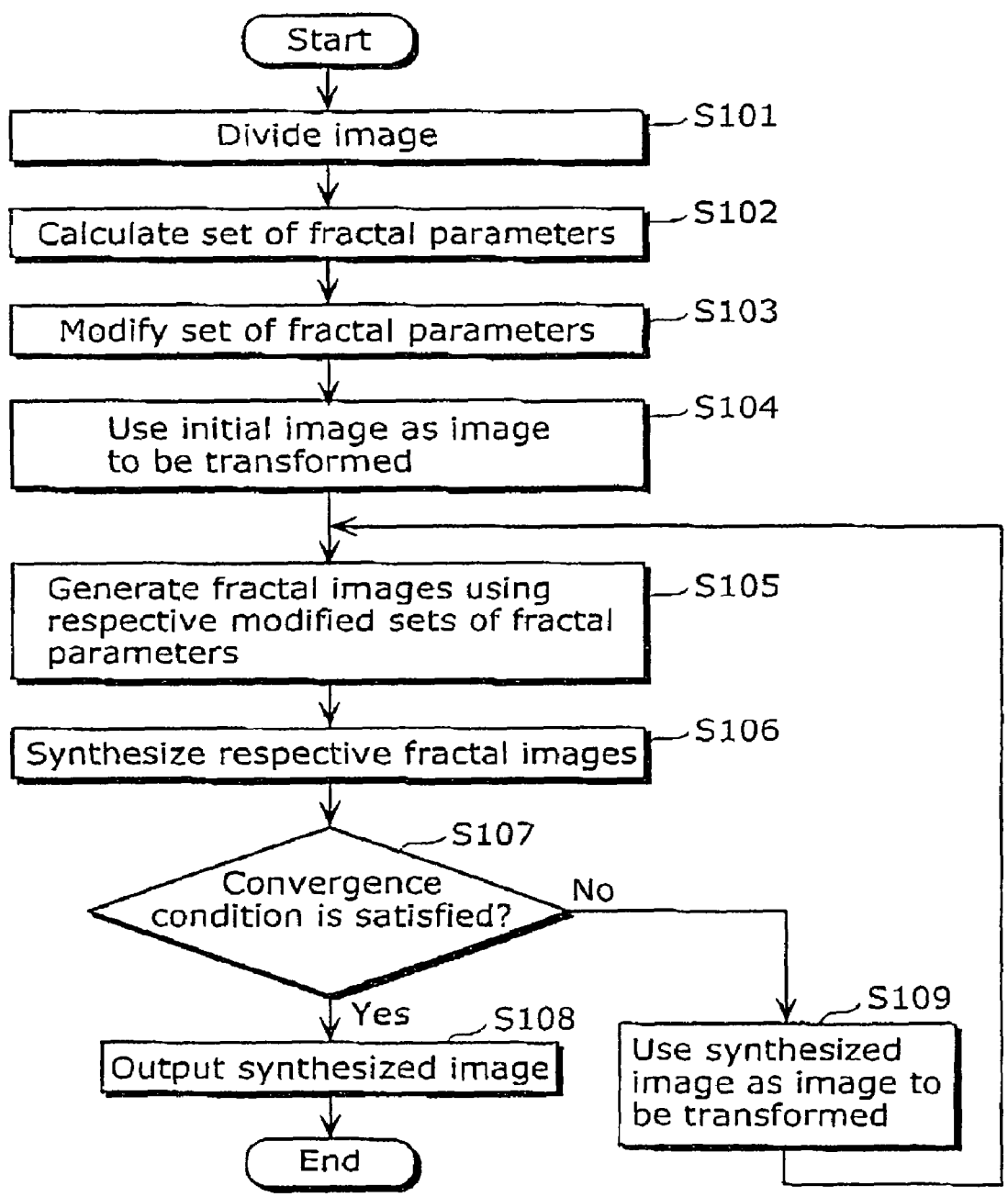
FIG. 6 is a flow chart showing the operation flow of the image processing apparatus of First Embodiment.

Next, the operation of the image processing apparatus 100 configured in the above described manner will be described below. FIG. 6 is a flow chart showing the operation flow of the image processing apparatus 100.

The image division unit 114 divides an input image IN held in the memory for input images 101 into plural range blocks using L numbers of division patterns so that at least one of the boundaries of each region in a division pattern varies from the boundaries of each region in the other division patterns (Step S101). Next, the parameter calculation unit 103 calculates sets of fractal parameters FP for the divided range blocks (Step S102). The parameter modification unit 104 modifies the sets of fractal parameters FP into the modified sets of fractal parameters FP' which are suitable for use in an enlargement ratio a (Step S103). The image transformation unit 107 uses the initial image generated by the initial image generation unit 106 as the image to be transformed (Step S104) so as to generate fractal images using the modified sets of fractal parameters FP' one by one (Step S105). Next, after the image transformation unit 107 completes the processing of the image to be transformed using all the modified sets of fractal parameters, the image synthesis unit 112 synthesizes L numbers of generated images G1 to GL held in the memories for generated images 1 to L into a single synthesized image GI (Step S106). After that, the image synthesis unit 112 judges whether or not the synthesized image GI satisfies the convergence condition (Step 5107). In the case where the synthesized image GI satisfies the convergence condition as the result (Step S107:Yes), the synthesized image GI is outputted from the switching unit 113 as an output image OT (Step S108) On the other hand, in the case where the synthesized image GI does not satisfy the convergence condition (Step S107: No), the synthesized image GI is inputted into the image transformation unit 107, and the image transformation unit 107 uses the synthesized image GI as the image to be transformed (Step S109) so as to perform the following processing (Step S105). After that, the image transformation unit 107 and the image synthesis unit 112 repeat the processing until the synthesized images GI are converged (Step S105 to S109).

As described up to this point, in the image processing method, an input image is divided into range blocks, and a set of fractal parameters is calculated for each range block. This division of the image into range blocks is performed using plural methods of changing the cutting-out position or the cutting-out shape, and a set of fractal parameters is calculated in each division method. Next, an initial image is prepared by enlarging an input image according to a desired enlargement ratio, and fractal transformed images are generated by enlarging the same initial image using the respective sets of fractal parameters (fractal parameters modified according to the respective enlargement ratios) one by one. After that, the images generated using the respective sets of fractal parameters are synthesized into a single synthesized image, and the transformation and synthesis using the sets of fractal parameters are repeated until the synthesized images are converged.

Thus, with the image processing method of the present invention, the use of a set of fractal parameters at the time of resolution enhancement (enlargement) of an input image makes it possible to generate a high-resolution (enlarged) image whose blocks have a high fidelity. In addition, the use of plural division patterns of range blocks at the time of calculating sets of fractal parameters makes it possible to obtain an image which has a high quality and resolution without leaving boundaries of adjacent blocks detectable although the boundaries of blocks were detectable in the conventional method.

The following three division patterns of dividing an input image into range blocks have been described in the image processing method of the present invention: a division pattern of dividing the input image into n×n pixels assuming the left top end as a starting point (the first pattern); a division pattern of dividing the input image into n×n pixels assuming the position shifted from the left top end by several pixels as a starting point (the second pattern); and a division pattern of dividing the input image into regions of m×m pixels with a lean of 45 degrees (the third pattern). Note that the shapes and division patterns for range blocks are not limited to those listed above. Other examples include: a pattern of forming range blocks into rectangle, parallelogram regions or the like other than square regions; and a pattern of forming a rotation angle of 30 degrees, 60 degrees or the like other than 45 degrees.

In addition, in the method which has been described in the image processing method of the present invention, the image transformation unit 107 performs one fractal transformation of the image to be transformed, and holds the fractal transformed images in the memories for generated images 109 to 111, and then the image synthesis unit 112 synthesizes these images. However, the transformation processing of this image transformation unit 107 is not limited to once, and the transformation processing may be performed plural times and then the fractal transformed images are held in the memories for generated images 109 to 111.

First Variation of First Embodiment

The above-described Embodiment can be modified as will be described below.

Figure 7:
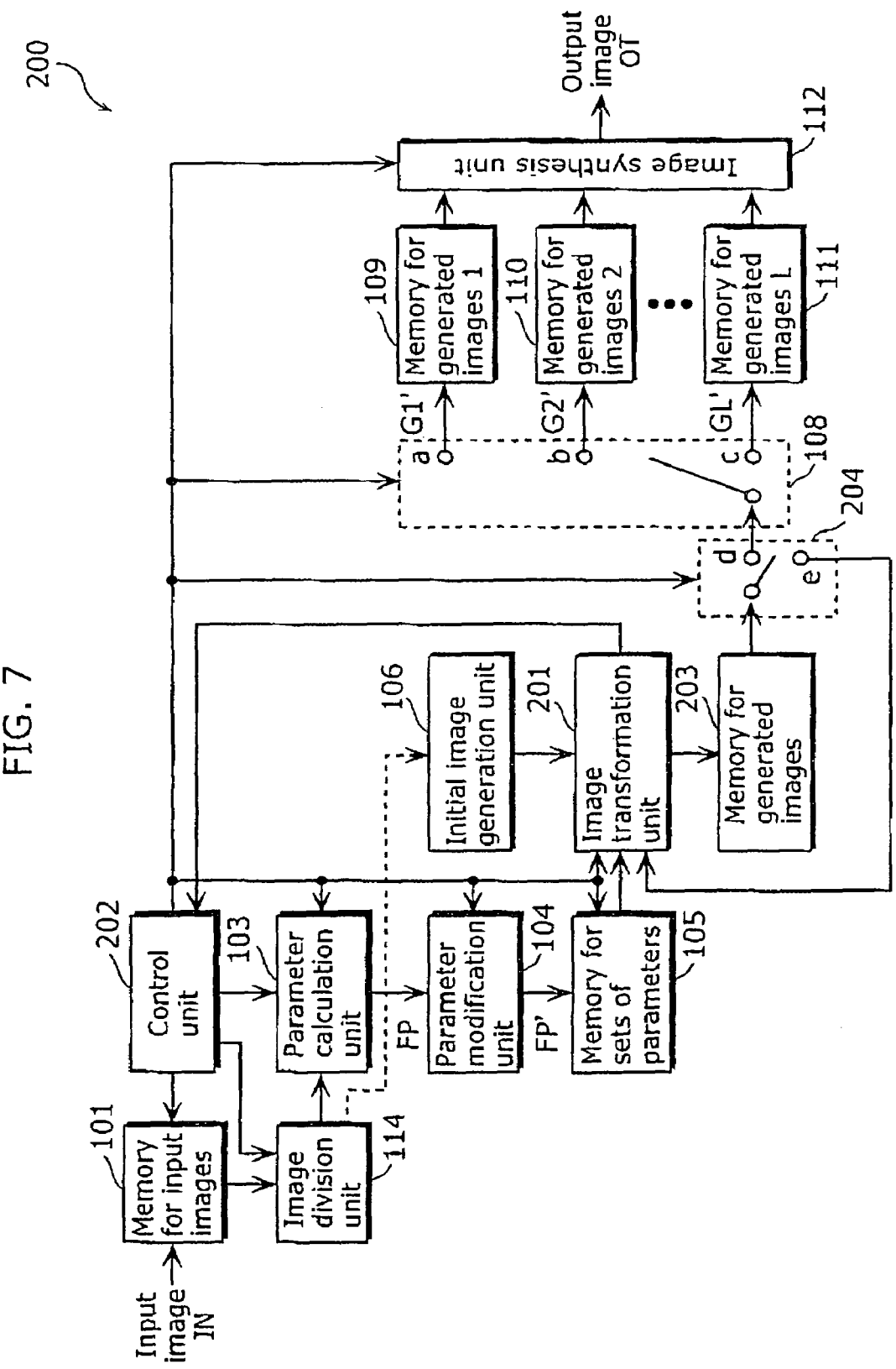
FIG. 7 is a block diagram showing the configuration of the image processing apparatus (in First Variation of First Embodiment) which uses the image processing method of the present invention.

First Variation will be described with reference to FIG. 7. FIG. 7 is a block diagram showing the configuration of the image processing apparatus 200 which uses the image processing method of First Variation of First Embodiment of the present invention. As shown in FIG. 7, the image processing apparatus 200 includes; a memory for input images 101; a control unit 202; a parameter calculation unit 103; a parameter modification unit 104; a memory for sets of parameters 105; an initial image generation unit 106; an image transformation unit 201; a switching unit 108; L numbers of memories for generated images 109 to 111; an image synthesis unit 112; a switching unit 204; a memory for generated images 203; and an image division unit 114.

As clearly shown by the comparison of FIG. 7 with FIG. 1, the order of the processes performed by the image transformation unit 201 and the following units vary between the image processing apparatus 200 and the image processing apparatus 100.

Figure 8:
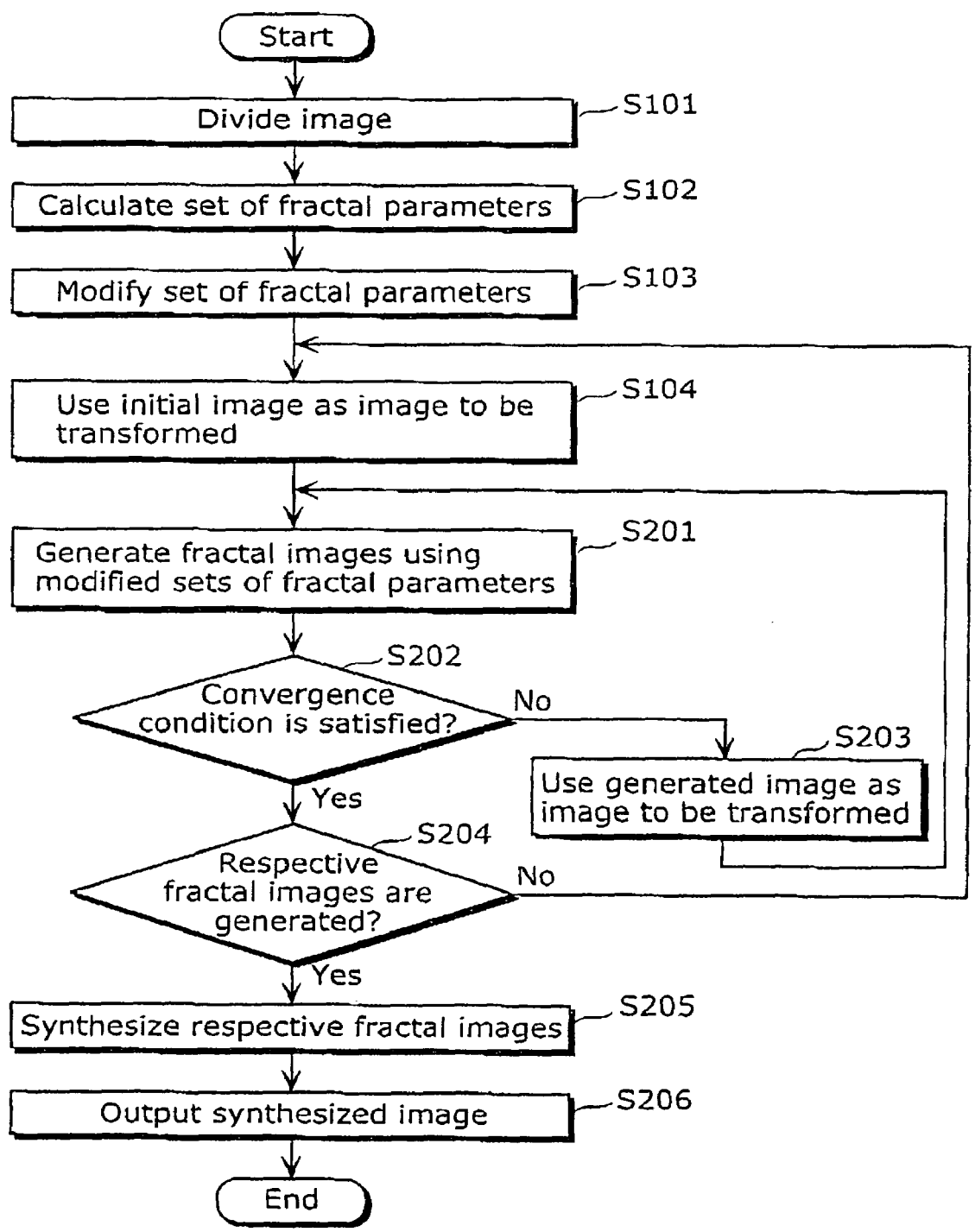
FIG. 8 is a flow chart showing the operation flow of the image processing apparatus in First Variation of First Embodiment.

FIG. 8 is a flow chart showing the operation flow of the image processing apparatus 200. The processes (Step S101 to S103) from the process of inputting an input image IN into the memory for input images 101 to the process of holding the modified sets of fractal parameters FP' into the memory for input images 101 are the same as the ones in First Embodiment, descriptions of them will be omitted.

The image transformation unit 201 uses the initial image generated by the initial image generation unit 106 as the image to be transformed (Step S104), and generates fractal images by using the modified sets of fractal parameters one by one from among the L numbers of modified sets of fractal parameters held in the memory for sets of parameters 105 (Step S201). The image transformation unit 201 holds the generated fractal images in the memory for generated images 203. The image transformation unit 201 judges whether or not generated fractal image satisfies the convergence condition (Step S202). As the result, in the case where it judges that generated fractal image is not converged (Step S202: No), the generated image is inputted into the image transformation unit 201 again through the switching unit 204. After that, the image transformation unit 201 uses the generated image as the image to be transformed (Step S203) and performs transformation processing of the image using the same modified set of fractal parameters. This processing is repeated until each generated image is converged. When the generated image satisfies the convergence condition (Step S202: Yes), it is held in one of the memories for generated images 1 to L through the switching unit 204 and 108. In this case, the image transformation unit 201 may judge whether the generated image is converged and notify the control unit 202 of the judgment, and the control unit 202 may control the switching unit 204. Next, the image transformation unit 201 judges whether or not the fractal images have been generated using all the modified sets of fractal parameters (Step S204). As the result, in the case where all the modified sets of fractal parameters have not been used in generating the fractal images (Step S204: No), the image transformation unit 201 performs the same processing (Step S104 to S203) using the next modified set of fractal parameters. After that, it performs the processing using the rest of modified sets of fractal parameters one by one so as to finally generate L numbers of converged images. Here, a generated image obtained based on a modified set of fractal parameters is held in a memory for the generated image. For example, the fractal image G1' processed using the first modified set of fractal parameters is held in the memory for generated images 1 (109), the fractal image G2' processed using the second modified set of fractal parameters is held in the memory for generated images 2 (110), and the fractal image GL' processed using the Lth modified set of fractal parameters is held in the memory for generated images L (111).

When all the modified sets of fractal parameters are used in generating fractal images (Step S204: Yes), the image synthesis unit 112 synthesizes the L numbers of generated images G1' to GL' held in the memories for generated images 1 to L into a single image (Step S205). Here, methods for synthesizing images include: a method for calculating the median value or the mean value of each L numbers of pixels which are present in the same positions of the images which correspond to each other; and a method for synthesizing only the pixels which are positioned close to the center parts of the enlarged range blocks. The synthesized image generated by the image synthesis unit 112 is outputted as an output image OT (Step S206).

As described up to this point, in the image processing method of the present invention, an input image is divided into range blocks and a set of fractal parameters is calculated for each range block. This division of the input image into the range blocks is performed according to plural patterns for changing the cutting-out position or the cutting-out shape, and a set of fractal parameters is calculated for each division pattern. Next, an initial image is prepared by enlarging an input image according to a desired enlargement ratio, and fractal transformed images are generated by being transformed using the respective sets of fractal parameters (fractal parameters modified according to the respective enlargement ratios) one by one. The transformation processing is repeated until the generated images are converged. After that, the converged images generated using the respective sets of fractal parameters are synthesized into a single synthesized image.

Thus, with the image processing method of the present invention, the use of fractal parameters at the time of resolution enhancement (enlargement) of an input image makes it possible to generate a high-resolution (enlarged) image whose blocks have a high fidelity. In addition, the use of plural division patterns of dividing the input image IN into range blocks at the time of calculating sets of fractal parameters makes it possible to obtain an image which has a high quality and resolution without leaving boundaries of adjacent blocks detectable although boundaries of blocks were detectable in the conventional method.

Second Variation of First Embodiment

Figure 9:
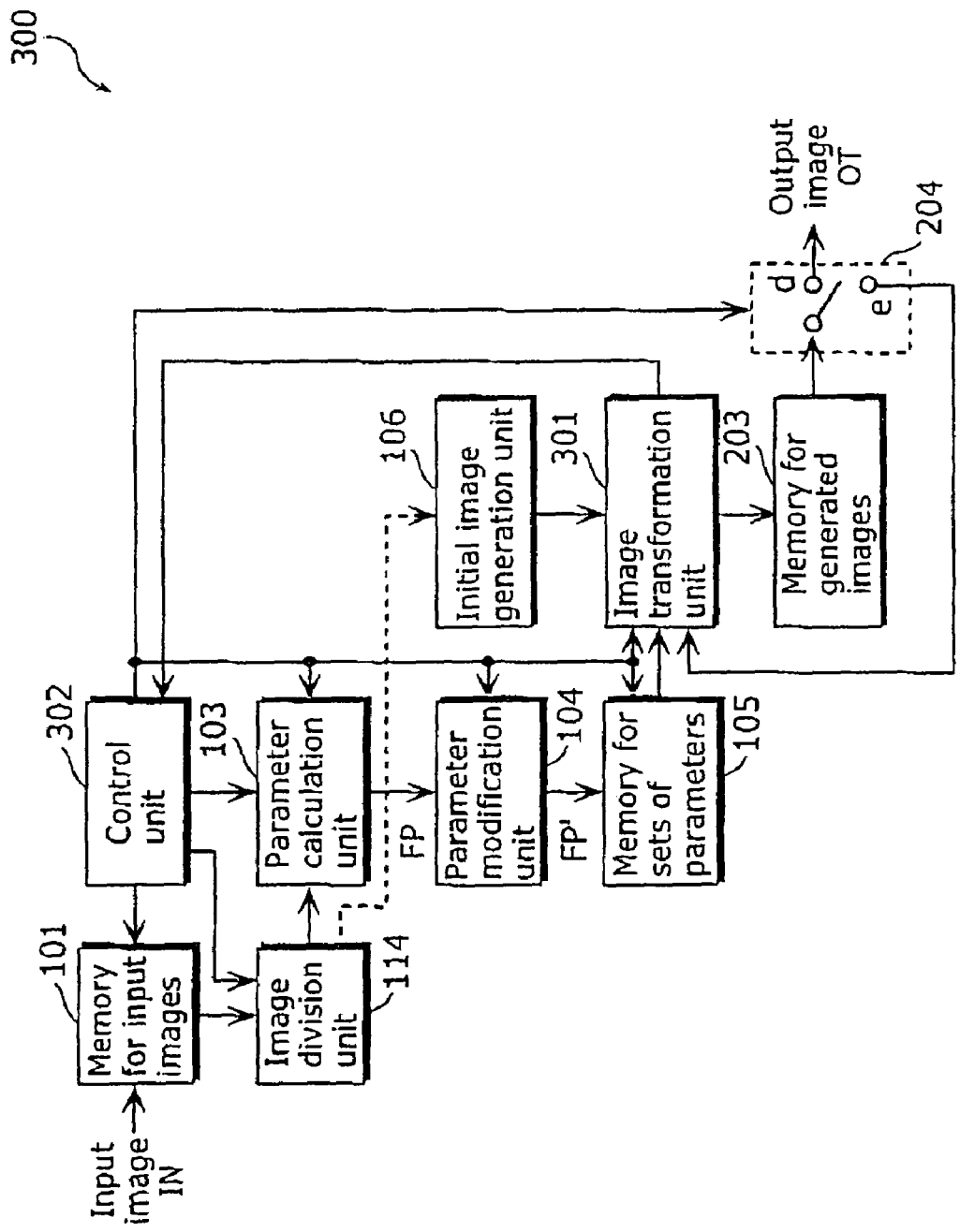
FIG. 9 is a block diagram (in Second Variation of First Embodiment) showing the configuration of the image processing apparatus which uses the image processing method of the present invention.

FIG. 9 is a block diagram showing the configuration of the image processing apparatus 300 which uses the image processing method of Second Variation of First Embodiment of the present invention. As shown in FIG. 9, the image processing apparatus 300 includes: a memory for input images 101; a control unit 302; a parameter calculation unit 103; a parameter modification unit 104; a memory for sets of parameters 105; an initial image generation unit 106; an image transformation unit 301; a switching unit 204; a memory for generated images 203; and an image division unit 114.

Figure 10:
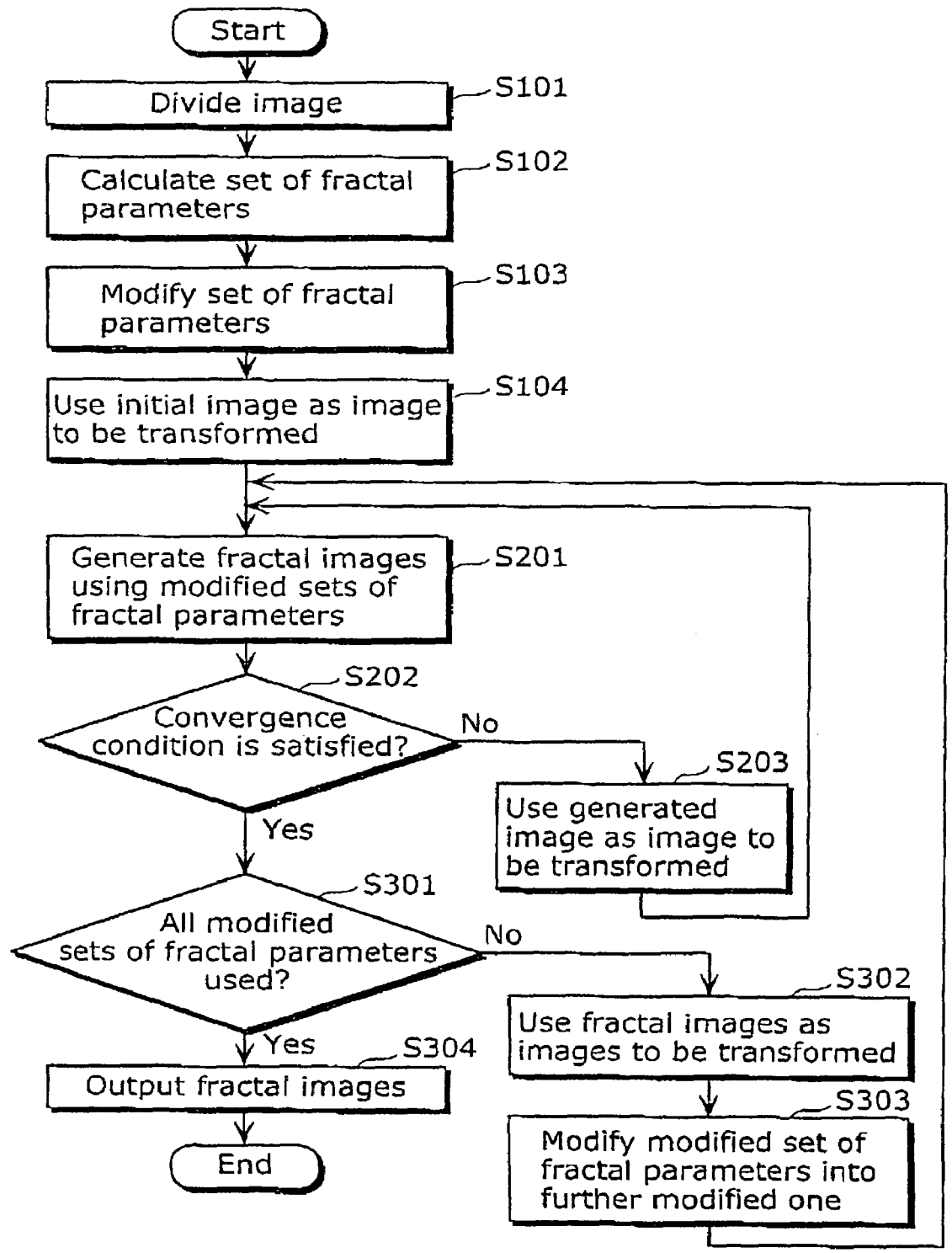
FIG. 10 is a flow chart showing the operation flow of the image processing apparatus in Second Variation of First Embodiment.

FIG. 10 is a flow chart showing the operation flow of the image processing apparatus 300. The processes (Step S101 to S103) from the process of inputting an input image IN into the memory for input images 101 to the process of holding the modified sets of fractal parameters FP' into the memory for input images 101 are the same as the ones in First Embodiment, and descriptions of them will be omitted.

The image transformation unit 301 uses the initial image generated by the initial image generation unit 106 as the image to be transformed (Step S104) and generates fractal images by using the modified sets of fractal parameters one by one from among the L numbers of modified sets of fractal parameters held in the memory for sets of parameters 105 (Step S201). The image transformation unit 301 holds the generated fractal images in the memory for generated images 203. The image transformation unit 301 judges whether or not generated fractal image satisfies the convergence condition (Step S202). As the result, in the case where it judges that generated fractal image is not converged (Step S202: No), the generated images are inputted into the image transformation unit 301 again through the switching unit 204. After that, the image transformation unit 301 uses the generated images as the images to be transformed (Step S203) and performs transformation processing of the images using the same modified set of fractal parameters. This processing is repeated until each generated image is converged. When the generated image satisfies the convergence condition (Step S202: Yes), the image transformation unit 301 judges whether or not all the modified sets of fractal parameters are used (Step S301). As the result, in the case where all the modified sets of fractal parameters have not been used in generating the fractal images (Step S301: No), the image transformation unit 201 uses the generated image which satisfies the convergence condition as the target image to be transformed (Step S302) and performs the same processing using the next modified set of fractal parameters. After that, it uses the rest of modified sets of fractal parameters in sequence (Step S303) and generates fractal images (Step S201 to S203). When all the modified sets of fractal parameters are used in generating fractal images (Step S301: Yes), the finally generated fractal image is outputted as an output image OT (Step S304).

As described up to this point, in this variation, at the time of transforming a fractal image using the second or one of the following sets of fractal parameters (the sets of fractal parameters modified according to the respective enlargement ratios), the current fractal image, which is converged using the set of fractal parameters which has been generated immediately before, is used as the fractal image to be transformed next. Therefore, there is no need to synthesize the already converged images generated using the respective sets of fractal parameters.

Second Embodiment

Figure 11:
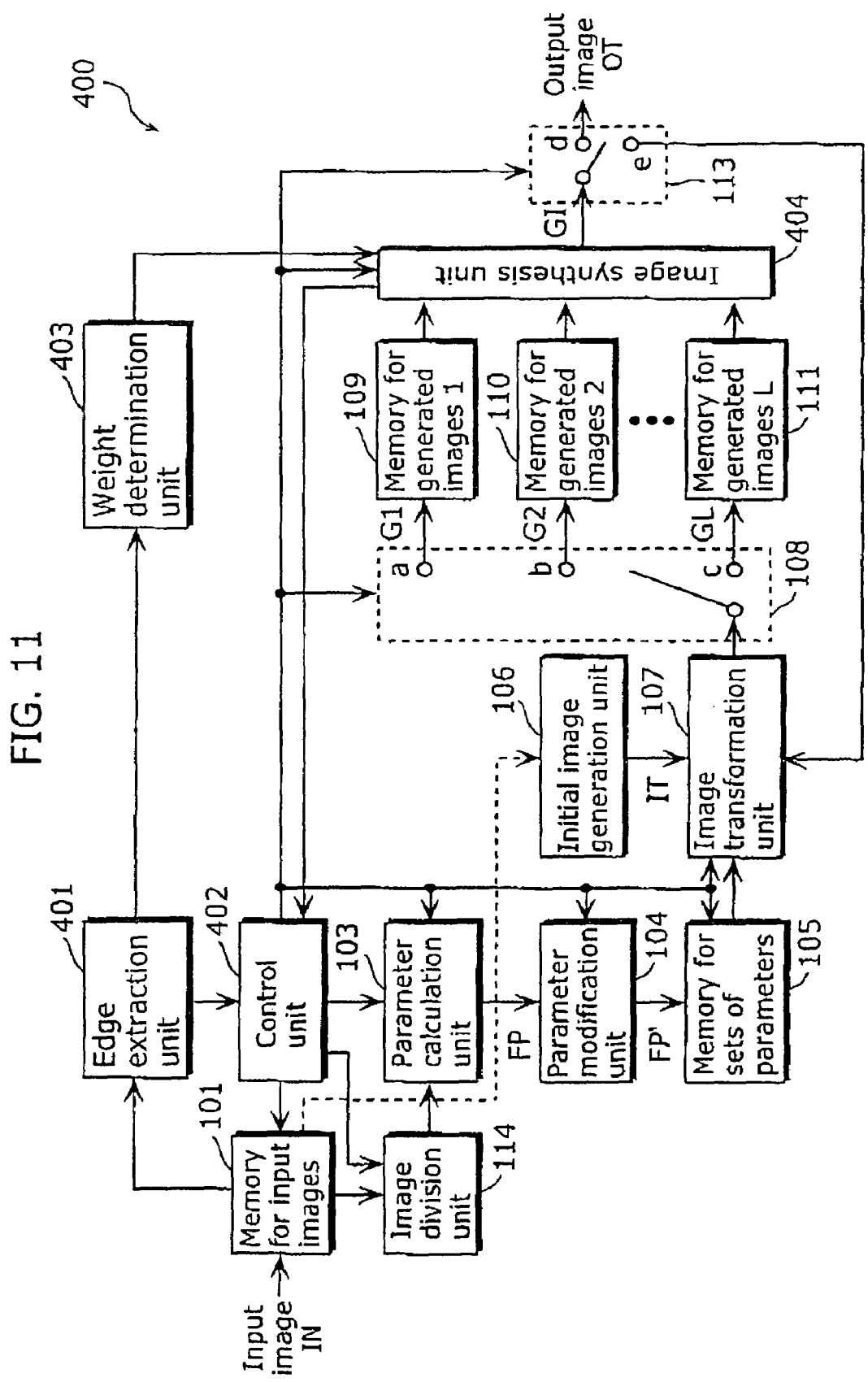
FIG. 11 is a block diagram (in Second Embodiment) showing the configuration of the image processing apparatus which uses the image processing method of the present invention.

FIG. 11 is a block diagram showing the configuration of the image processing apparatus 400 which uses the image processing method of the second embodiment of the present invention. Note that the same units as the ones in First Embodiment are assigned the same reference numbers, and the descriptions of them will be omitted.

As shown in FIG. 11, the image processing apparatus 400 has the same configuration of the image processing apparatus of First Embodiment and further includes an edge extraction unit 401 and a weight determination unit 403.

The edge extraction unit 401 extracts an edge in an input image IN. Note that one of the generally used methods for detecting edges may be used as the method for detecting edges here.

The control unit 402 generates L (L is an integer of 2 or more) numbers of division patterns so that at least one of the boundaries of each region in a division pattern varies from the boundaries of each region in the other division patterns, based on the edge positions detected by the edge extraction unit 401.

Figure 12C:
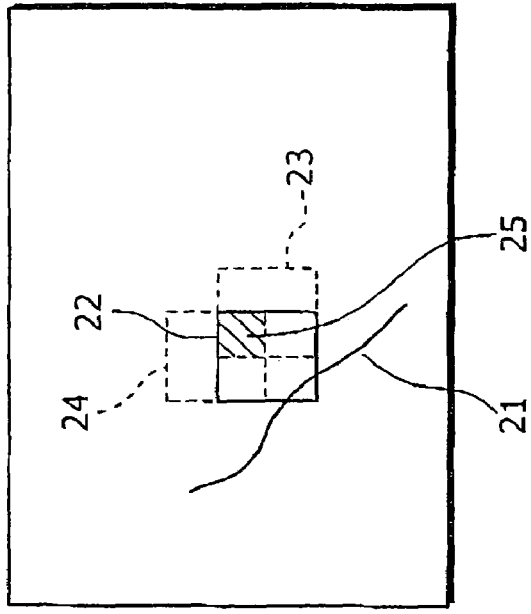
FIG. 12C is a diagram for illustrating how to determine the weights of the respective range blocks.
Figure 12A:
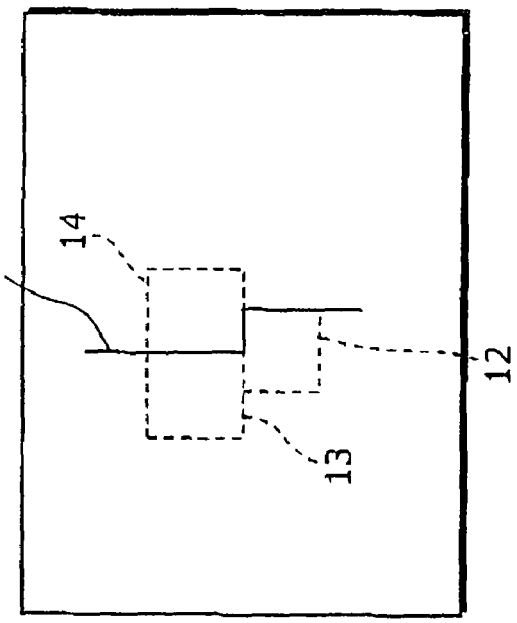
FIGS. 12A and 12B each is a diagram for showing a division pattern example at the time of dividing an input image IN into range blocks.
Figure 12B:
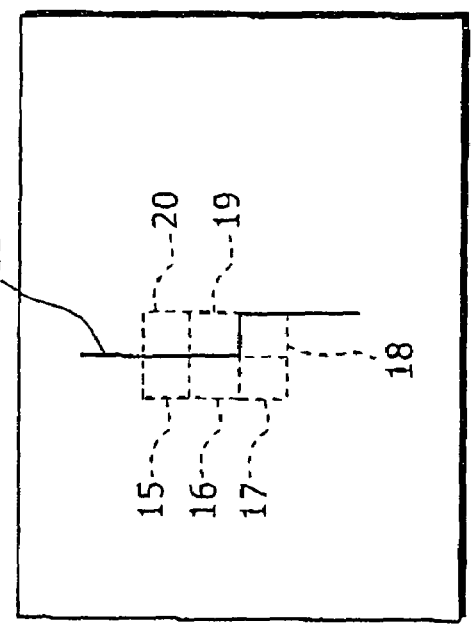

FIGS. 12A and 12B each is a diagram showing a division pattern example at the time of dividing an input image IN into range blocks. For example, as shown in FIG. 12A, in the case where the edge extraction unit 401 has detected an edge 11, the control unit 402 generates, as one of the division patterns, a division pattern of dividing the image into a range block 12, a range block 13, and a range block 14 and the like so that the edge 11 becomes the boundaries between the range blocks. In addition, as shown in FIG. 12B, the control unit 402 generates, as another division pattern, a division pattern of dividing the image into a range block 15, a range block 16, a range block 17, a range block 18, a range block 19 and the like so that the edge 11 becomes the boundaries between the range blocks. In this way, the control unit 402 generates L numbers of division patterns so that at least one of the boundaries of each region in a division pattern varies from the boundaries of each region in the other division patterns.

The image division unit 114 divides an input image IN into range blocks using L numbers of division patterns generated by the control unit 402.

The weight determination unit 403 determines the weights of the respective fractal images at the time when the image synthesis unit 404 synthesizes L numbers of fractal images based on the edge positions detected by the edge extraction unit 401.

FIG. 12C is a diagram for illustrating how to determine the weights of the respective fractal images. Here, the following descriptions will be provided on assumption that the input image IN is divided according to three types of division patterns, the image transformation unit 107 generates three fractal images using three modified sets of fractal parameters, and the image synthesis unit 404 synthesizes three fractal images. In addition, it is also assumed that the edge extraction unit 401 has detected, for example, an edge 21 as shown in FIG. 20C.

The weight determination unit 403 determines the weights of the respective range blocks 22 to 24 with respect to a region 25 which is shown as the shaded portion in FIG. 12C. The range block 22 is obtained by the division according to the division pattern 1 among the three types of division patterns, the range block 23 is obtained by the division according to the division pattern 2, and the range block 24 is obtained by the division according to the division pattern 3. In this case, the weight determination unit 403 determines to provide the range block 22 including the edge 21 with a weight which is higher than the weights provided to the range block 23 and the range block 24 which do not include the edge 21. For example, it determines to provide a weight of "1" to the range block 22, and weights of "2" to the range block 23 and the range block 24.

The image synthesis unit 404 synthesizes L numbers of fractal images using the weights determined by the weight determination unit 403. In the above-described example, the image synthesis unit 404 synthesizes three fractal images for the region which corresponds to the region 25 which is shown as the shaded portion in FIG. 12C, providing (a) a weight of "1" to the fractal image generated based on the division pattern 1 corresponding to the range block 22, (b) a weight of "2" to the fractal image generated based on the division pattern 2 corresponding to the range block 23, and (c) a weight of "2" to the fractal image generated based on the division pattern 3 corresponding to the range block 24. Here, methods used in the case of synthesizing fractal images using weights include: a method for using, as the pixel values of the synthesized image, the mean value of the weights of the pixel values of the pixels which are present in the same positions of the images which correspond to each other; a method for using, as the pixel values of the synthesized image, the median value of the weights of the pixel values of the pixels which are present in the same positions of the images which correspond to each other; and a method for using, as the pixel values of the synthesized image, the pixel values with the maximum weights of the pixels which are present in the same positions of the images which correspond to each other.

As described up to this point, an edge is extracted from an input image so as to generate each of the L numbers of division patterns so that at least one of the boundaries of each region in a division pattern varies from the boundaries of each region in the other division patterns based on the edge position. Therefore, it is possible to obtain an image which has a high quality and resolution without leaving boundaries of adjacent blocks detectable. In addition, the weights of the respective fractal images at the time of synthesizing L numbers of fractal images are determined based on the extracted edge position. This makes it possible to generate a high-resolution (enlarged) image whose blocks have a high fidelity.

In this embodiment, based on the extracted edge positions, L numbers of division patterns are generated and the weights of the respective fractal images at the time of synthesizing fractal images are determined. However, a method for determining the weights of the respective fractal images is not limited to this. For example, it is possible to generate L numbers of division patterns in the same manner as used in First Embodiment, and determine, based on the edge positions, the weights of the respective fractal images at the time of synthesizing the fractal images. In addition, it is possible to generate only L numbers of division patterns based on the extracted edge positions without determining the weights of the respective fractal images at the time of synthesizing the fractal images and synthesize the respective fractal images in the same manner as used in First Embodiment.

Further, to generate division patterns based on the extracted edge positions can be applied to not only the case where fractal images are generated using L numbers of division patterns as described in this embodiment and First Embodiment but also the case where fractal images are generated using only a single division pattern.

First Variation of Second Embodiment

Figure 13:
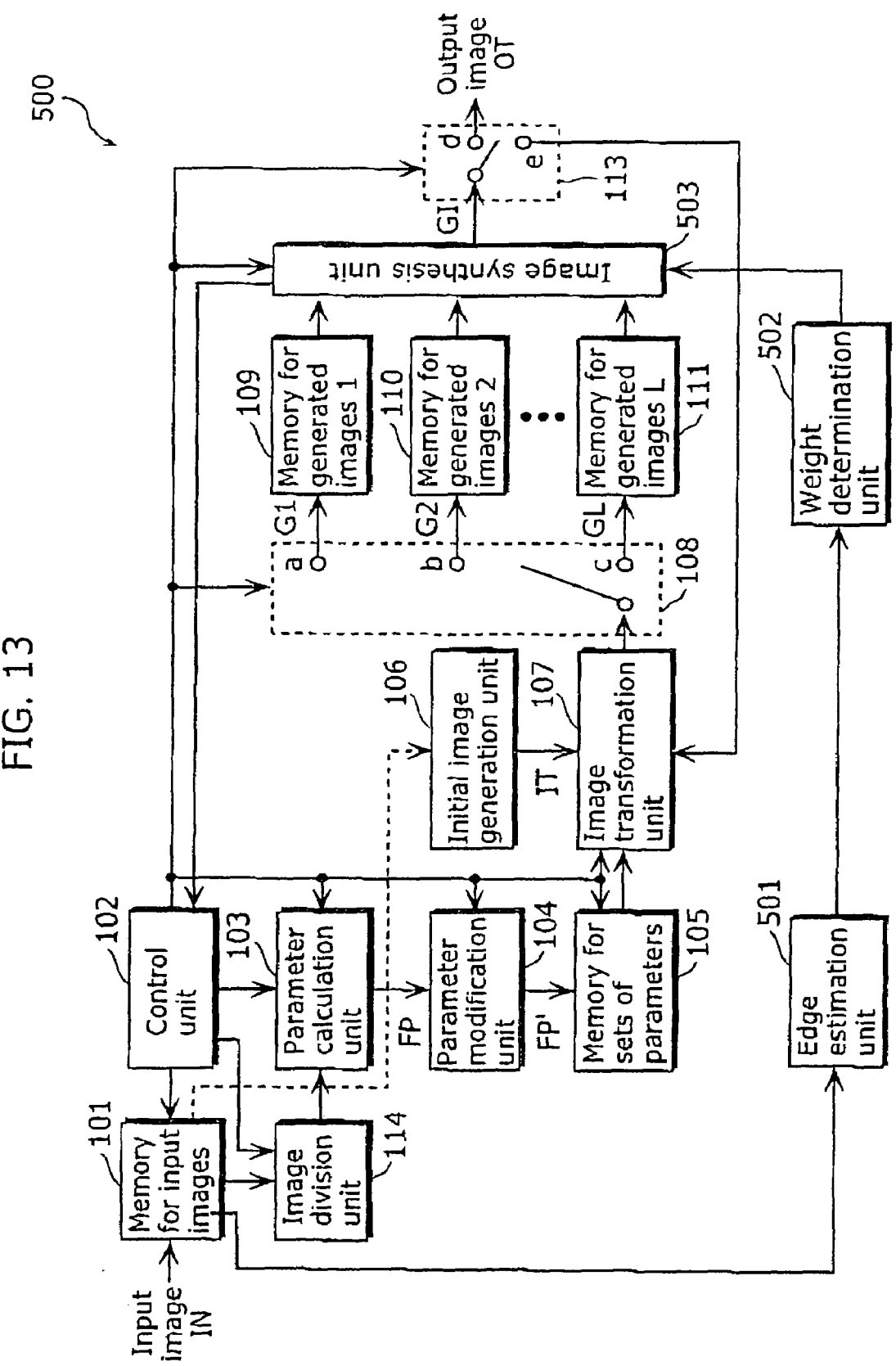
FIG. 13 is a block diagram showing the configuration of the image processing apparatus (in First Variation of Second Embodiment) which uses the image processing method of the present invention.

FIG. 13 is a block diagram showing the configuration of the image processing apparatus 500 which uses the image processing method of First Variation of Second Embodiment of the present invention. Note that the same units as the ones in First Embodiment are assigned the same reference numbers, and descriptions of them will be omitted.

As shown in FIG. 11, the image processing apparatus 500 has the same configuration of the image processing apparatus 100 of First Embodiment, and further includes an edge estimation unit 501 and a weight determination unit 502.

The edge estimation unit 501 enlarges an input image IN in an enlargement ratio a, and generates an enlarged image which has a size of aM×aN pixels. Here, available methods for enlarging the input image IN include the zero-order hold method, the bilinear method, the bicubic method. In addition, the edge estimation unit 501 detects edges from the generated enlarged image. Note that one of the generally used methods for detecting edges may be used as the method for detecting edges here.

The weight determination unit 502 determines the weights of the respective fractal images at the time when the image synthesis unit 503 synthesizes L numbers of fractal images based on the edge positions detected by the edge estimation unit 501. Note that the operations of the weight determination unit 502 and the image synthesis unit 503 are the same as the weight determination unit 403 and the image synthesis unit 404 of Second Embodiment.

As described up to this point, since an enlarged image is generated and then the edges are detected, it is possible to generate a high-resolution (enlarged) image whose blocks have a higher fidelity.

The case of performing resolution enhancement (enlargement) of an input image has been described in each of the above embodiments, but it should be noted that cases are not limited to the case. For example, it is possible to process an input image using L numbers of division patterns as described above also in the case where the input image is not enlarged.

Third Embodiment

Further, to record a program for realizing the image processing method shown in the above-described embodiments makes it possible to easily perform the processing shown in the respective embodiments in an independent computer system.

Figure 14A:
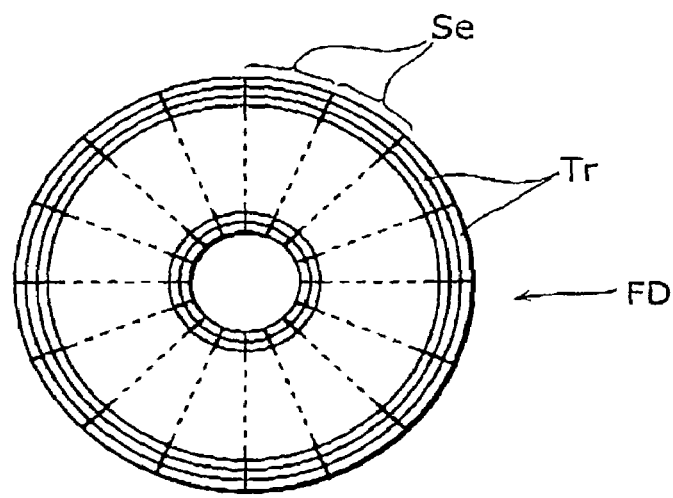
FIG. 14A to 14C each is an illustration of a recording medium for storing a program intended for realizing the image processing method (in Second Embodiment) of the respective embodiments in a computer system.
Figure 14B:
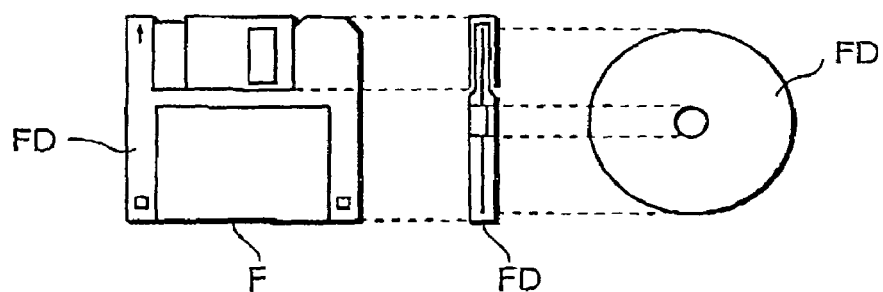
Figure 14C:
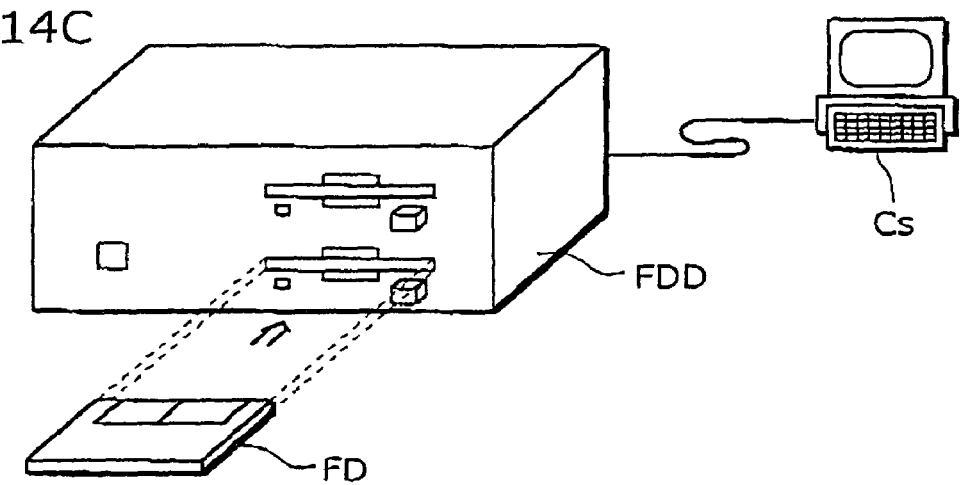

FIG. 14A to 14C each is an illustration of the case where a program intended for causing a computer to perform the image processing method of the above-described embodiment is recorded on a recording medium such as a flexible disc, and the program is executed in a computer system. FIG. 14A shows an example of a physical format of a flexible disc as a recording medium body. FIG. 14B shows a flexible disc and the front view and the cross-sectional view of the appearance of the flexible disc. A flexible disc (FD) is contained in a case F, a plurality of tracks (Tr) are formed concentrically on the surface of the disc from the periphery into the inner radius of the disc, and each track is divided into 16 sectors (Se) in the angular direction. Therefore, in the case of the flexible disc storing the above-mentioned program, the program is recorded in an area allocated for It on the flexible disc (FD).

Also, FIG. 14C shows the configuration for recording and reproducing the program on the flexible disc (FD). When the program is recorded on the flexible disc (FD), the computer system (Cs) writes the program in the flexible disc via a flexible disc drive. When the image processing method described above is constructed in the computer system using the program on the flexible disc, the program is read out from the flexible disc through the flexible disc drive and transferred to the computer system.

The above description has been provided assuming that the recording medium is a flexible disc. However, it is possible to use an optical disc as the recording medium. Additionally, the recording medium is not limited to a flexible disc, and a DC-ROM, a DVD-ROM, a memory card, a ROM cassette or another recording medium can also be used.

Fourth Embodiment

Further, here will be described an application example of the image processing method shown in the embodiments and a system in which the application example is used.

Figure 15:
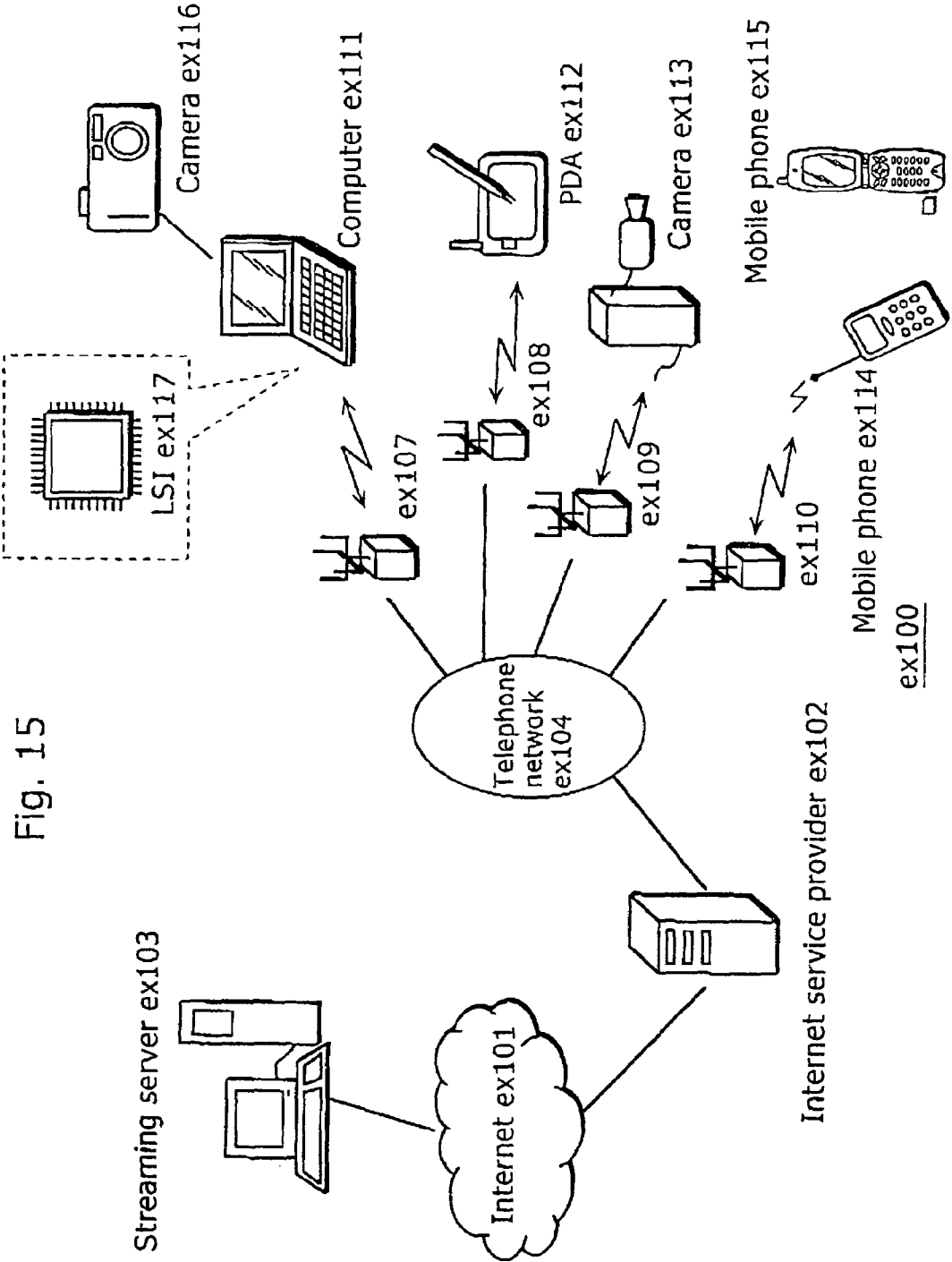
FIG. 15 is a block diagram showing the overall configuration of a content supply system (in Third Embodiment)

FIG. 15 is a block diagram showing the overall configuration of a content supply system ex100 which realizes a content distribution service. The area for providing the communication service is divided into cells of desired sizes, and cell sites ex107 to ex110 of fixed wireless stations are placed in the respective cells.

This content supply system ex100 is connected to each apparatus such as a computer ex111, a Personal Digital Assistant (PDA) ex112, a camera ex113, a mobile phone ex114 and a mobile phone with a camera ex115 via, for example, a combination of the Internet ex101, an Internet service provider ex102, a telephone network ex104 and cell sites ex107 to ex110.

However, the content supply system ex100 is not limited to the configuration as shown in FIG. 15, and may be connected to a combination of any of them. Also, each apparatus can be connected directly to the telephone network ex104, not through the cell sites as fixed radio stations ex107 to ex110.

The camera ex113 is an apparatus capable of shooting video (moving pictures) such as a digital video camera. The mobile phone can be a mobile phone of a Personal Digital Communications (PDC) system, a Code Division Multiple Access (CDMA) system, a Wideband-Code Division Multiple Access (W-CDMA) system or a Global System for Mobile Communications (GSM) system, a Personal Handyphone system (PHS) or the like.

A streaming server ex103 is connected to the camera ex113 via the cell site ex109 and the telephone network ex104, which enables live distribution or the like using the camera ex113 based on the coded data transmitted from the user. Either the camera ex113 or the server for transmitting the data may code the shot data. Also, the moving image data shot by a camera ex116 may be transmitted to the streaming server ex103 via the computer ex111. The camera ex116 is an apparatus such as a digital camera which is capable of shooting still and moving images. In this case, either the camera ex116 or the computer ex111 may code the moving image data. An LSI ex117 included in the computer ex111 or the camera ex116 performs coding processing. Software for coding and decoding images may be integrated into an any type of storage medium (such as a CD-ROM, a flexible disc, a hard disc or the like) that is a recording medium readable by the computer ex111 or the like. Furthermore, a mobile phone with a camera ex115 may transmit the moving image data. This moving image data is the data coded by the LSI included in the mobile phone ex115.

The contents supply system ex100 codes contents (such as a music live video) shot by a user using the camera ex113, the camera ex116 or the like in the same manner as the above-described embodiments, and transmits it to the streaming server ex103, while the streaming server ex103 distributes the contents data in a coded stream to the clients upon their request. The clients include the computer ex111, the PDA ex112, the camera ex113, the mobile phone ex114 and so on that are capable of decoding the above-mentioned coded data. In this way, the contents supply system ex100 enables the clients to receive and reproduce the coded data, and further to receive, decode the data and reproduce the decoded data in real time so as to realize personal broadcasting.

When each apparatus in this system performs coding or decoding, the image coding apparatus or the image decoding apparatus may be used as shown in the above-described embodiments.

A mobile phone will be explained as an example of the apparatus.

Figure 16:
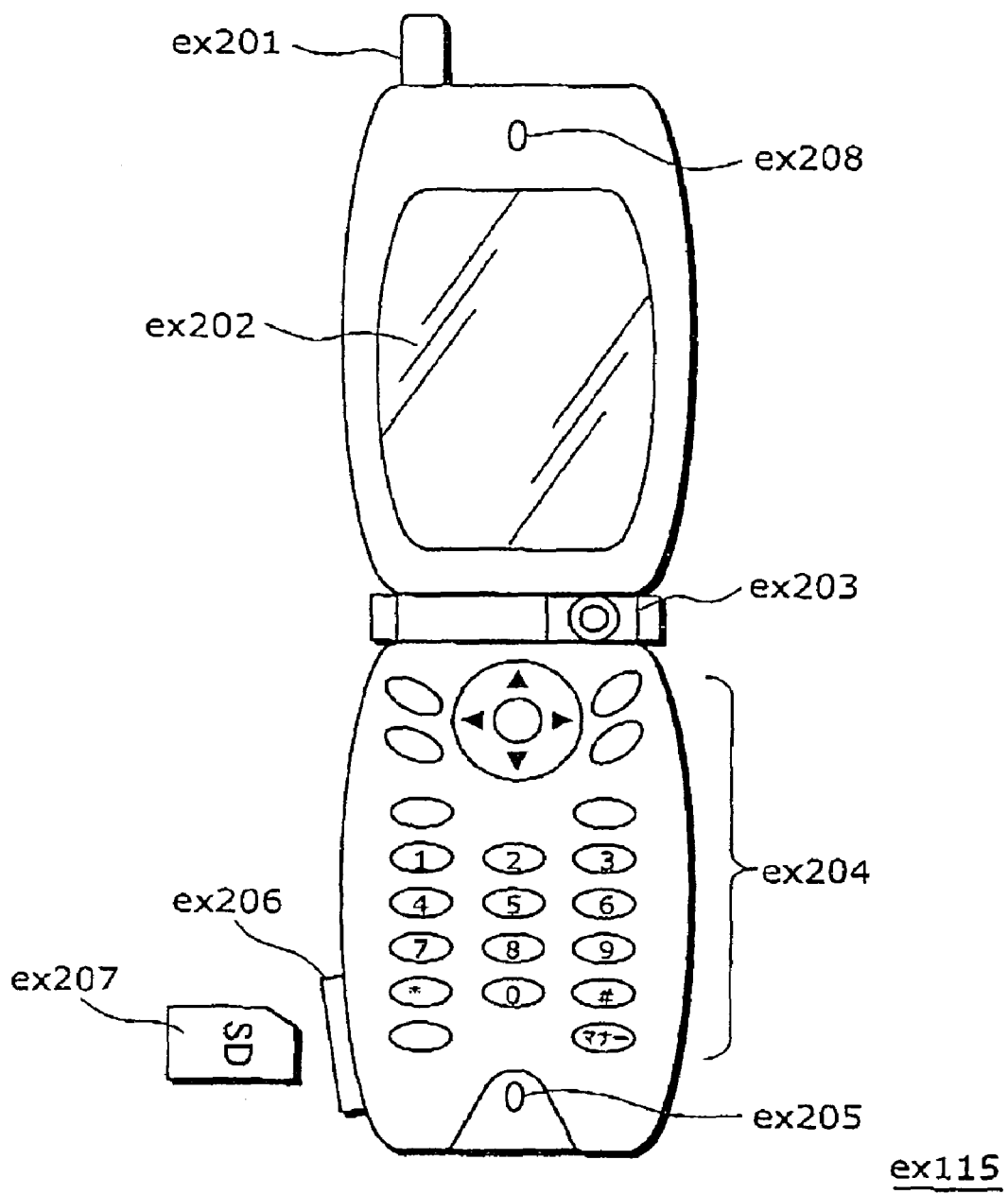
FIG. 16 is an example of a mobile phone (in Third Embodiment) which uses the image processing method.

FIG. 16 is a diagram showing the mobile phone ex115 which uses the image processing method described in the above embodiments. The mobile phone ex115 includes: an antenna ex201 for communicating with the cell site ex110 via radio waves; a camera unit ex203 capable of shooting moving and still images such as a CCD camera; a display unit ex202 such as a liquid crystal display for displaying moving images shot by the camera unit ex203, the data obtained by decoding moving images and the like received by the antenna ex201; a body unit including a set of operation keys ex204; a voice output unit ex208 such as a speaker for outputting voices; a voice input unit 205 such as a microphone for inputting voices; a storage medium ex207 for storing coded or decoded data such as data of moving or still images shot by the camera, data of received e-mail and data of moving or still images; and a slot unit ex206 which attaches the storage medium ex207 to the mobile phone ex115. The storage medium ex207 is equipped with a flash memory element, a kind of Electrically Erasable and Programmable Read Only Memory (EEPROM) that is an electrically erasable and rewritable nonvolatile memory, in a plastic case such as an SD card.

Next, the mobile phone ex115 will be described with reference to FIG. 17. In the mobile phone ex115, a main control unit ex311, which performs centralized control on each unit of the body unit including the display unit ex202 and operation keys ex204, is connected each other to the followings via a synchronous bus ex313: a power supply circuit unit ex310; an operation input control unit ex304; an image coding unit ex312; a camera interface unit ex303; a Liquid Crystal Display (LCD) control unit ex302; an image decoding unit ex309; a demultiplexing unit ex308; a recording and reproducing unit ex307; a modem circuit unit ex306 and a voice processing unit ex305.

When a call-end key or a power key is turned ON by a user's operation, the power supply circuit unit ex310 supplies respective components with power from a battery pack so as to activate the digital mobile phone with a camera ex115 for making it into a ready state.

In the mobile phone ex115, the voice processing unit ex305 converts the voice signals received by the voice input unit ex205 in a conversation mode into digital voice data under the control of the main control unit ex311 including a CPU, a ROM and a RAM, the modem circuit unit ex306 performs spread spectrum processing of the digital voice data, and the communication circuit unit ex301 performs digital-to-analog conversion and frequency transformation of the data so as to transmit it via the antenna ex201. Also, in the mobile phone ex115, the communication circuit unit ex301 amplifies the data received by the antenna ex201 in a conversation mode and performs frequency transformation and analog-to-digital conversion for the data, the modem circuit unit ex306 performs inverse spread spectrum processing of the data, and the voice processing unit ex305 converts it into an analog voice signal so as to output it via the voice output unit ex208.

Furthermore, when transmitting e-mail in a data communication mode, the text data of the e-mail inputted by operating the operation keys ex204 on the body unit is sent out to the main control unit ex311 via the operation input control unit ex304. In the main control unit ex311, the modem circuit unit ex306 performs spread spectrum processing of the text data, the communication circuit unit ex301 performs digital-to-analog conversion and frequency transformation for it, and then the data is transmitted to the cell site ex110 via the antenna ex201.

When image data is transmitted in a data communication mode, the image data shot by the camera unit ex203 is supplied to the image coding unit ex312 via the camera interface unit ex303. When the image data is not transmitted, it is also possible to display the image data shot by the camera unit ex203 directly on the display unit 202 via the camera interface unit ex303 and the LCD control unit ex302.

The image coding unit ex312, which includes the image coding apparatus as described in the present invention, compresses and codes the image data supplied from the camera unit ex203 using the coding method used for the image processing apparatus as shown in the above-described embodiments so as to transform it into coded image data, and sends it out to the demultiplexing unit ex308. At this time, the mobile phone ex115 sends out the voices received by the voice input unit ex205 during the shooting by the camera unit ex203 to the demultiplexing unit ex308 as digital voice data via the voice processing unit ex305.

The demultiplexing unit ex308 multiplexes the coded image data supplied from the image coding unit ex312 and the voice data supplied from the voice processing unit ex305 using a predetermined method, the modem circuit unit ex306 performs spread spectrum processing on the multiplexed data obtained as a result of the multiplexing, and the communication circuit unit ex301 performs digital-to-analog conversion and frequency transformation of the data and then transmits the resulting data via the antenna ex201.

As for receiving data of a moving image file which is linked to a Web page or the like in a data communication mode, the modem circuit unit ex306 performs spread spectrum processing of the data received from the cell site ex110 via the antenna ex201, and sends out the multiplexed data obtained as a result of the processing to the demultiplexing unit ex308.

In order to decode the multiplexed data received via the antenna ex201, the demultiplexing unit ex308 separates the multiplexed data into a coded bit stream of image data and a coded bit stream of voice data, and supplies the current coded image data to the image decoding unit ex309 and the current voice data to the voice processing unit ex305 respectively via the synchronous bus ex313.

Next, the image decoding unit ex309, which includes the image decoding apparatus as described in the present invention, decodes the coded bit stream of image data using the decoding method corresponding to the coding method as shown in the above-described embodiments so as to generate reproduced moving image data, and supplies this data to the display unit ex202 via the LCD control unit ex302, and thus, for instance, the moving image data included in a moving image file linked to a Web page is displayed. At the same time, the voice processing unit ex305 converts the voice data into analog voice data, and supplies this data to the voice output unit ex208, and thus, for instance, voice data included in a moving image file linked to a Web page is reproduced.

Figure 18:
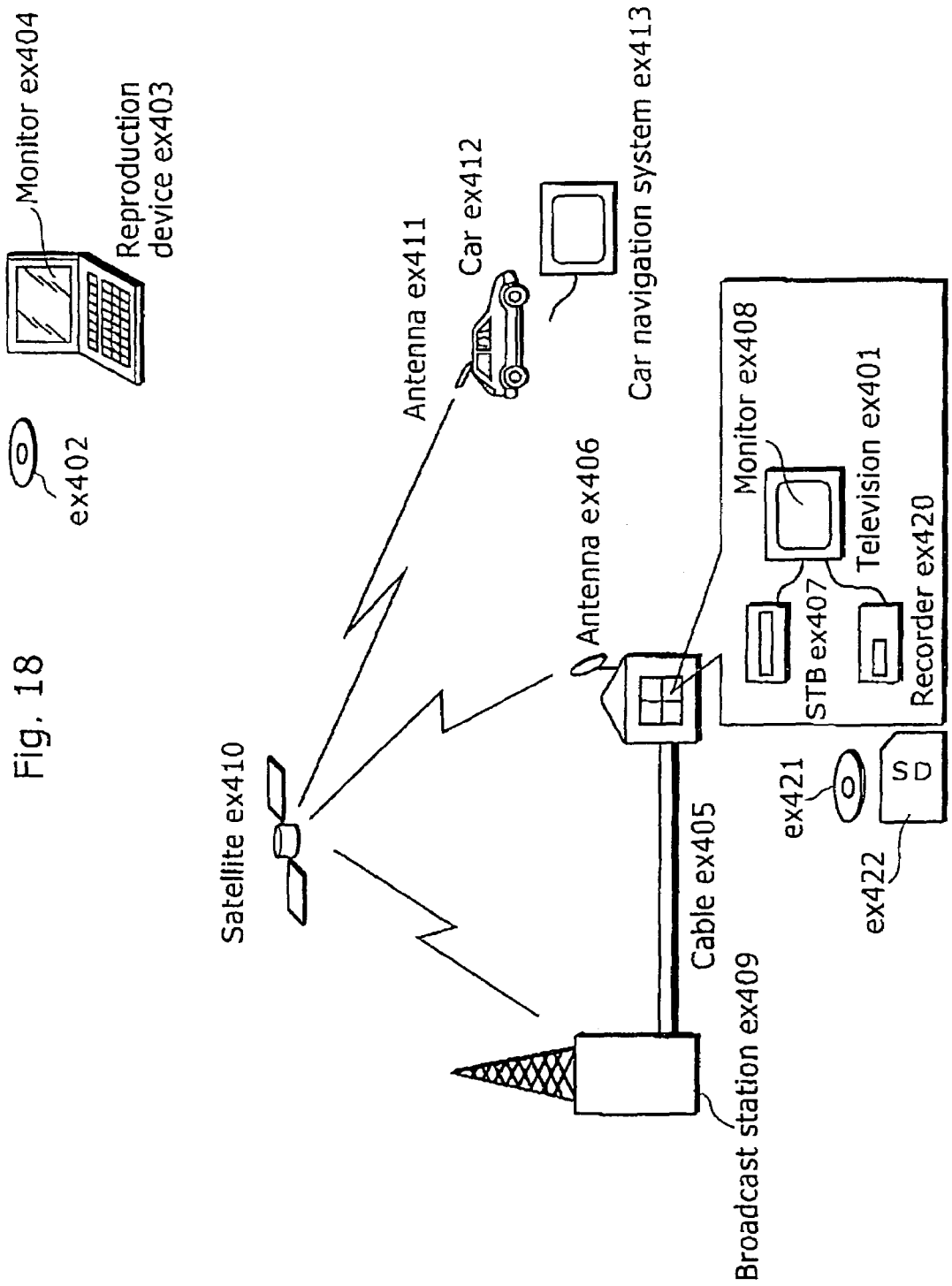
FIG. 18 is an example of a system (in Third Embodiment) intended for digital broadcasting.

The present invention is not limited to the above-described system, and at least either the image coding apparatus or the image decoding apparatus in the above-described embodiments can be incorporated into a digital broadcasting system as shown in FIG. 18. Such ground-based or satellite digital broadcasting has been in the news lately. More specifically, a coded bit stream of video information is transmitted from a broadcast station ex409 to a communication or a broadcast satellite ex410 via radio waves. Upon receipt of it, the broadcast satellite ex410 transmits radio waves for broadcasting, a home-use antenna ex406 with a satellite broadcast reception function receives the radio waves, and a television (receiver) ex401, a set top box (STB) ex407 or the like decodes the coded bit stream so as to reproduce the decoded bit stream. The image decoding apparatus as shown in the above-described embodiments can be implemented in the reproduction apparatus ex403 which reads out and decodes the bit stream recorded on a storage medium ex402 that is a recording medium such as a CD and a DVD. In this case, the reproduced video signals are displayed on a monitor ex404. It is also conceived to implement the image decoding apparatus in the set top box ex407 connected to a cable ex405 intended for a cable television or the antenna ex406 intended for satellite and/or ground-based broadcasting so as to reproduce these signals on a monitor ex408 of the television. The image decoding apparatus may be incorporated into the television, in stead of in the set top box. Or, a car ex412 having an antenna ex411 can receive signals from the satellite ex410, the cell site ex107 or the like in order to reproduce moving images on a display device such as a car navigation system ex413.

Furthermore, the image encoding apparatus shown in the above-described embodiments can code image signals for recording on a recording medium. As a concrete example, there is a recorder ex420 such as a DVD recorder for recording image signals on a DVD disc ex421 and a disc recorder for recording them on a hard disc. They can be recorded on an SD card ex422. In the case where the recorder ex420 includes the image decoding apparatus shown in the above-described embodiments, the image signals recorded on the DVD disc ex421 or the SD card ex422 can be reproduced so as to be displayed on the monitor ex408.

Figure 17:
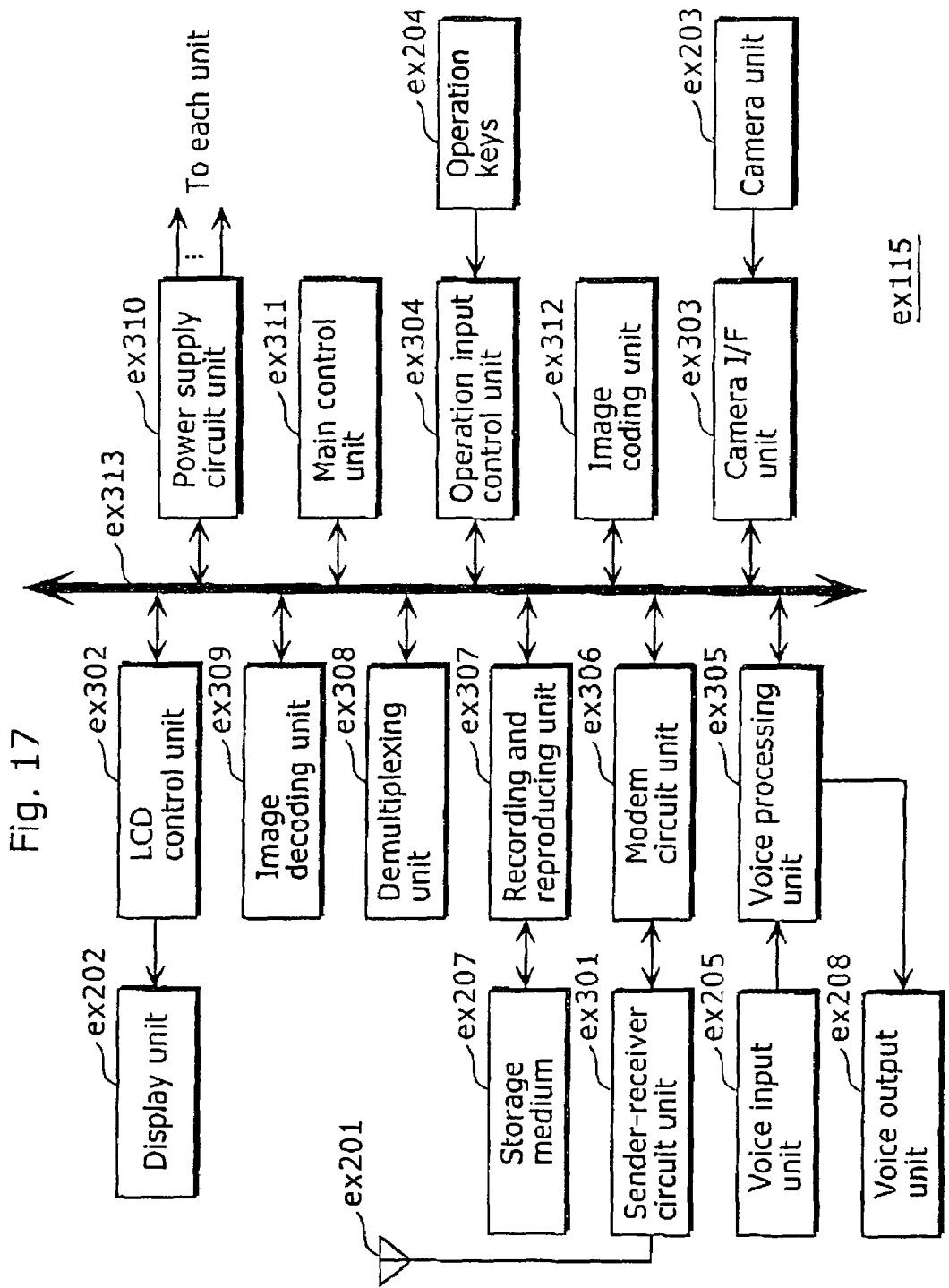
FIG. 17 is a block diagram of the mobile phone (in Third Embodiment)

Note that a conceivable configuration of the car navigation system ex413 is the configuration obtained by eliminating the camera unit ex203, the camera interface unit ex303 and the image coding unit ex312 from existing components in FIG. 17. The same goes for the computer ex111, the television (receiver) ex401 and the like.

In addition, the following three types of implementation can be conceived for a terminal: a sending/receiving terminal implemented with both an encoder and a decoder, a sending terminal implemented with an encoder only, and a receiving terminal implemented with a decoder only.

As described above, it is possible to use the image processing method described in the above embodiments in any of the above-described apparatuses and systems, and by using this method, the effects described in the above embodiments can be obtained.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

In addition, the respective functional blocks in the block diagrams shown in FIGS. 1, 7, 9, 11 and 13 are typically realized as an LSI which is an integrated circuit. They may be respectively formed into a chip, or a part or all of them may be integrated into a chip (for example, the functional blocks other than the memories may be integrated into a chip.)

Here, the integrated circuit is called LSI, but it may be called IC, system LSI, super LSI or ultra LSI depending on the integration degree.

In addition, a method for integrating the functional blocks into an integrated circuit is not limited to a method of using an LSI, they may be realized in an exclusive circuit or a general processor. Additionally, it is possible to use an FPGA (Field Programmable Gate Array) which is programmable or a reconfigurable processor which can reconstruct the connection or the settings of the circuit cells inside the LSI.

Further, when a technique for integration into an integrated circuit replaces an LSI resulting from development of a semiconductor technique and another technique derived from the semiconductor technique, the new technique can of course be used for integrating functional blocks into an integrated circuit. Application of bio technique is likely.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

The image processing method of the present invention provides an effect of making it possible to perform resolution enhancement (enlargement) of an input image keeping the quality high. Thus, it is useful as an image processing method in storage, transmission, communication and the like of images.

What is claimed is:

1. An image processing method for performing fractal transformation on an input image of a first size, and generating an output image of a second size, greater than the first size, said image processing method comprising using a processor to perform the steps of:

dividing the input image into L sets of first regions, defined by boundaries, using L division patterns, so that at least one of boundaries of the first regions, corresponding to one of the L division patterns, is different from the boundaries of each first region in the other L division patterns, L being an integer equal to or greater than 2;

generating scaled-down images by performing, using parameters for each of the L sets of first regions in the input image, respectively, contractive affine transformation on reference regions, each respective reference region being included in the input image and being greater in size than a first region that refers to the respective reference region, and calculating L sets of fractal parameters used for the fractal transformation on an input image of the first size by calculating, for each first region in the L sets of first regions, a corresponding one of the fractal parameters in the L sets of fractal parameters, the contractive affine transformation being performed for each possible combination of the reference region and the parameter, each fractal parameter in the L sets of fractal parameters being fractal information indicating (i) the parameter used to generate, for a corresponding one of the first regions in the L sets of first regions, a scaled-down image having a highest correlation with the corresponding first region and (ii) a position of the reference region used in combination with the parameter;

modifying the L sets of fractal parameters into respective L sets of modified fractal parameters for the fractal transformation on an image of the second size; and generating the output image of the second size by performing the fractal transformation on a target image, the fractal transformation including the contractive affine transformation performed on the reference regions, included in the target image and indicated by the L sets of modified fractal parameters, and performed using the parameters indicated by the L sets of modified fractal parameters for each modified fractal parameter in the L sets of modified fractal parameters.

2. The image processing method according to claim 1, wherein in said generating of the output image, L fractal images are generated by performing the fractal transformation on the target image using the L sets of modified fractal parameters, and a synthesized image is generated by synthesizing the L fractal images, and the synthesized image is the output image.

3. The image processing method according to claim 2, wherein in said generating of the output image, it is judged whether the generated synthesized image satisfies a predetermined convergence condition, and each of the L fractal images is generated by performing the fractal transformation on the synthesized image again, using a corresponding one of the L sets of modified fractal parameters, when it is judged that the synthesized image does not satisfy the predetermined convergence condition.

4. The image processing method according to claim 2, wherein in said generating of the fractal images, the fractal transformation is repeated until the fractal images that satisfy a predetermined convergence condition are obtained, the fractal transformation being performed for each modified fractal parameter in the L sets of modified fractal parameters.

5. The image processing method according to claim 2, said method further comprising:
   extracting an edge in the input image; and
   determining a weight of each fractal image used in said generating of the synthesized image based on a position of the extracted edge,
   wherein in said dividing of the input image into first regions, the input image is divided into first regions based on the position of the edge, and
   in said generating of the synthesized image, the L fractal images are synthesized based on the weight of each fractal image.

6. The image processing method according to claim 5, wherein in said determining of the weight of each fractal image, the weight of each region to be synthesized is determined so that a fractal image to be generated based on the region including the edge is assigned with a light weight, and
   in said generating of the synthesized image, the L fractal images are generated using weights determined for the respective predetermined regions to be synthesized.

7. The image processing method according to claim 2, said method further comprising:
   estimating an edge in an enlarged image obtained by enlarging the input image according to an enlargement ratio; and
   determining a weight of each fractal image which is used in said generating of the synthesized image based on a position of the edge,
   wherein in said generating of the synthesized image, the L of fractal images are synthesized based on the weight of the fractal image.

8. The image processing method according to claim 1, wherein in said generating of the output image, each of the fractal images, which constitute the output image, is generated in the following sequence:
   performing the fractal transformation on an image of the second size using the L sets of modified fractal parameters so as to generate intermediate fractal images; and
   performing the fractal transformation on each of the intermediate fractal images using one of the other modified fractal parameters in the L sets of modified fractal parameters so as to generate the fractal images which constitute the output image,
   wherein the fractal images which constitute the output image are generated by performing the fractal transformation using all the L sets of modified fractal parameters.

9. The image processing method according to claim 1, said method further comprising extracting an edge in the input image,
   wherein in said dividing of the input image into first regions, the input image is divided into first regions based on the position of the edge.

10. The image processing method according to claim 9, wherein in said dividing of the input image into first regions, the input image is divided into first regions so that the edge becomes boundaries between the regions.

11. The image processing method according to claim 1, wherein in said dividing of the input image into first regions, the L division patterns are used to divide the input image at different division starting positions, respectively.

12. The image processing method according to claim 1, wherein in said dividing of the input image into first regions, the L division patterns are used to produce different divided shapes, respectively.

13. An image processing apparatus which performs fractal transformation on an input image of a first size, and generating an output image of a second size, greater than the first size, said image processing apparatus comprising:
   a division unit configured to divide the input image into L sets of first regions, defined by boundaries, using L division patterns, so that at least one of boundaries of the first regions, corresponding to one of the L division patterns, is different from the boundaries of each first region in the other L division patterns, L being an integer equal to or greater than 2;
   a parameter calculation unit configured to generate scaled-down images by performing, using parameters for each of the L sets of first regions in the input image, respectively, contractive affine transformation on reference regions, each respective reference region being included in the input image and being greater in size than a first region that refers to the respective reference region, and calculate L sets of fractal parameters used for the fractal transformation on an image of the first size by calculating, for each first region in the L sets of first regions, a corresponding one of the fractal parameters in the L sets of fractal parameters, the contractive affine transformation being performed for each possible combination of the reference region and the parameter, each fractal parameter in the L sets of fractal parameters being fractal information indicating (i) the parameter used to generate, for a corresponding one of the first regions in the L sets of first regions, a scaled-down image having a highest correlation with the corresponding first region and (ii) a position of the reference region used in combination with the parameter;
   a parameter modification unit configured to modify the L sets of fractal parameters into respective L sets of modified fractal parameters for the fractal transformation on an image of the second size; and
   an image transformation unit configured to generate the output image of the second size by performing the fractal transformation on a target image, the fractal transformation including the contractive affine transformation performed on the reference regions, included in the target image and indicated by the L sets of modified fractal parameters, and performed using the parameters indicated by the L sets of modified fractal parameters for each modified fractal parameter in the L sets of modified fractal parameters.

14. A computer-readable recording medium on which a program is recorded, causing the computer to implement an image processing method for performing fractal transformation on an input image of a first size, and generating an output image of a second size, said image processing method comprising using a processor to perform the steps of:
   dividing the input image into L sets of first regions, defined by boundaries, using L division patterns, so that at least one of boundaries of the first regions, corresponding to one of the L division patterns, is different from the boundaries of each first region in the other L division patterns, L being an integer equal to or than 2;

generating scaled-down images by performing, using parameters for each of the L sets of first regions in the input image, respectively, contractive affine transformation on reference regions, each respective reference region being included in the input image and being greater in size than a first region that refers to the respective reference region, and calculating L sets of fractal parameters used for the fractal transformation on an image of the first size by calculating, for each first region in the L sets of first regions, a corresponding one of the fractal parameters in the L sets of fractal parameters, the contractive affine transformation being performed for each possible combination of the reference region and the parameter, each fractal parameter in the L sets of fractal parameters being fractal information indicating (i) the parameter used to generate, for a corresponding one of the first regions in the L sets of first regions, a scaled-down image having a highest correlation with the corresponding first region and (ii) a position of the reference region used in combination with the parameter;

modifying the L sets of fractal parameters into respective L sets of modified fractal parameters for the fractal transformation on an image of the second size; and generating the output image of the second size by performing the fractal transformation on a target image, the fractal transformation including the contractive affine transformation performed on the reference regions, included in the target image and indicated by the L sets of modified fractal parameters, and performed using the parameters indicated by the L sets of modified fractal parameters for each modified fractal parameter in the L sets of modified fractal parameters.

* * * * *